(12) United States Patent
Farrokh Baroughi et al.

(10) Patent No.: US 12,387,670 B2
(45) Date of Patent: Aug. 12, 2025

(54) ELECTRONIC DISPLAY TIMING TO MITIGATE IMAGE ARTIFACTS OR MANAGE SENSOR COEXISTENCE

(71) Applicant: Apple Inc., Cupertino, CA (US)

(72) Inventors: Mahdi Farrokh Baroughi, Santa Clara, CA (US); Ce Zhang, Cupertino, CA (US); Haitao Li, Mountain View, CA (US); Hari P Paudel, Milpitas, CA (US); Hopil Bae, Palo Alto, CA (US); Jeongsup Lee, Santa Clara, CA (US); Nikhil Acharya, Mountain View, CA (US); Pablo Moreno Galbis, Burlingame, CA (US); Seung B Rim, Pleasanton, CA (US); SeyedAli TaheriTari, San Jose, CA (US); Shengzhe Jiao, San Diego, CA (US); Stanley B Wang, Cupertino, CA (US); Sunmin Jang, Sunnyvale, CA (US); Xiang Lu, Campbell, CA (US); Yaser Azizi, Santa Clara, CA (US); Young Don Bae, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/368,982

(22) Filed: Sep. 15, 2023

(65) Prior Publication Data
US 2024/0105115 A1 Mar. 28, 2024

Related U.S. Application Data

(60) Provisional application No. 63/409,572, filed on Sep. 23, 2022.

(51) Int. Cl.
*G09G 3/3216* (2016.01)

(52) U.S. Cl.
CPC ..... *G09G 3/3216* (2013.01); *G09G 2320/041* (2013.01); *G09G 2320/0626* (2013.01); *G09G 2330/021* (2013.01); *G09G 2360/144* (2013.01)

(58) Field of Classification Search
CPC ........... G09G 3/3216; G09G 2320/041; G09G 2320/0626; G09G 2330/021;
(Continued)

(56) References Cited

U.S. PATENT DOCUMENTS 8,941,602 B2 1/2015 Kim
8,970,535 B2 3/2015 Saitoh
(Continued)

FOREIGN PATENT DOCUMENTS

KR 20120106214 A 9/2012
KR 20170119282 A 10/2017
(Continued)

*Primary Examiner* — Matthew A Eason
*Assistant Examiner* — Chayce R Bibbee
(74) *Attorney, Agent, or Firm* — Fletcher Yoder, P.C.

(57) ABSTRACT

Electronic devices, displays, and methods are provided for operating an electronic display in coexistence with sensors that could be adversely impacted by the operation of the electronic display. An electronic device may include an electronic display and a sensor. The electronic display may display image content by light emission during an emission period and periodically enter a quiet period in which the light emission of the electronic display is turned off. The sensor may perform sensing operations during the quiet period without interference from the operation of the electronic display.

25 Claims, 19 Drawing Sheets

(58) Field of Classification Search
CPC ..... G09G 2360/144; G09G 2300/0408; G09G 2300/0804; G09G 3/2088; G09G 3/3225; G09G 3/3233; G09G 2320/043; G09G 2354/00; G09G 2360/145; G06F 3/04184; G06F 3/0412

See application file for complete search history.

(56) References Cited

U.S. PATENT DOCUMENTS

| | | | |
|---|---|---|---|
| 9,058,072 | B2 | 6/2015 | Bae |
| 9,292,117 | B2 | 3/2016 | Kim |
| 9,361,847 | B2 | 6/2016 | Choi |
| 9,575,584 | B2 | 2/2017 | Pyo |
| 10,216,319 | B2 | 2/2019 | Cho |
| 10,528,183 | B2 | 1/2020 | Kim |
| 10,712,853 | B2 | 7/2020 | Hwang |
| 10,916,219 | B2 | 2/2021 | Liu |
| 11,036,952 | B2 | 6/2021 | Hung |
| 11,216,544 | B2 | 1/2022 | Lee |
| 11,422,612 | B2 | 8/2022 | Choi |
| 11,579,717 | B2 | 2/2023 | Lee |
| 11,629,994 | B1 | 4/2023 | Zhou |
| 11,635,832 | B2 | 4/2023 | Lin |
| 2003/0030419 | A1* | 2/2003 | Murakata ............... H02M 3/156 323/283 |
| 2004/0104686 | A1* | 6/2004 | Shin ...................... G09G 3/3266 315/169.3 |
| 2014/0267217 | A1* | 9/2014 | Lillie ........................ G09G 3/20 345/214 |
| 2016/0078832 | A1* | 3/2016 | Ota ...................... G09G 3/3655 345/212 |
| 2018/0239488 | A1* | 8/2018 | Lin ......................... G06F 3/0443 |
| 2019/0347980 | A1* | 11/2019 | Kuo .......................... G09G 3/32 |
| 2020/0033979 | A1* | 1/2020 | Sauer ...................... G06F 3/044 |
| 2021/0125562 | A1* | 4/2021 | Li ........................ G09G 3/3258 |
| 2022/0171494 | A1 | 6/2022 | Shih |
| 2022/0206682 | A1* | 6/2022 | Tian ................... G06F 3/04847 |

FOREIGN PATENT DOCUMENTS

| | | |
|---|---|---|
| KR | 102020282 B1 | 9/2019 |
| KR | 102181293 B1 | 11/2020 |
| KR | 102298338 B1 | 9/2021 |
| KR | 102375642 B1 | 3/2022 |
| KR | 102478682 B1 | 12/2022 |

\* cited by examiner

ELECTRONIC DISPLAY TIMING TO MITIGATE IMAGE ARTIFACTS OR MANAGE SENSOR COEXISTENCE

CROSS-REFERENCE TO RELATED APPLICATIONS

This application claims priority to U.S. Provisional Application No. 63/409,572, filed Sep. 23, 2022, entitled "Electronic Display Timing to Mitigate Image Artifacts or Manage Sensor Coexistence," the disclosure of which is incorporated by reference in its entirety for all purposes.

SUMMARY

This disclosure relates to performing electronic display operations according to a timing that manages coexistence with sensors near the electronic display and reduces or eliminates image artifacts.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Numerous electronic devices—such as computers, mobile phones, portable media devices, tablets, televisions, virtual-reality headsets, and vehicle dashboards, among many others—often include electronic displays. To display an image, an electronic display may control light emission of its display pixels based on corresponding image data for the display pixels. By emitting light in various brightness values at different display pixels according to the image data, the electronic display may present an image.

Many electronic displays include touch sensor functionality to enable a person to interact with a user interface on the electronic display. Many electronic displays also use an ambient light sensor to detect the amount or color of ambient light to adjust the brightness or color of the display to match the ambient light. For such an electronic display, however, operating the electronic display may cause electromagnetic interference that may affect the touch sensor functionality. Moreover, the light from the electronic display may be detected by the ambient light sensor and may offer a distorted view of the ambient light.

To manage coexistence with sensors such as these, the electronic display may be controlled according to a timing that causes the electronic display to periodically stop operating for a quiet period. During the quiet period, the electronic display may not emit light or program pixels with new image data. The touch sensor functionality may be used during the quiet period with reduced electromagnetic interference and the ambient light sensor may detect ambient light without contamination from the electronic display. During the quiet period, the electronic display may decouple from the power supply or power may be diverted from display circuitry of the electronic display panel and to touch sensor circuitry. The quiet period may take place several times per image frame (e.g., new image content) so as to be imperceptible to the human eye. Moreover, different areas of the electronic display may start and end shutting down at slightly different times before or after the quiet period.

To avoid image artifacts that could arise due to the quiet period, additional mitigation operations may be used. To mitigate undesirable light emission from the last row of pixels that had been activated going into the quiet period, all rows of pixels may be coupled to an off-bias voltage. This may cause all of the rows, including the most recently activated row, not to emit light during the quiet period. To mitigate dimness in the next rows activated after the quiet period, an additional precharge period may be provided for those rows immediately following the quiet period or even partially during the quiet period. This may ameliorate the hysteresis of the circuitry and allow the next row to achieve a desired level of brightness immediately after the quiet period. Furthermore, to prevent undesired light emission due to excess charge from a parasitic capacitance after a quiet period, a reset voltage may be applied at certain specific times. Because applying the reset voltage between driving every pixel could consume excessive power, the reset voltage may be applied strategically. For example, the reset voltage may be applied based on the distance from one row to the next row, based on the gray levels applied from one row to another row, and/or based on the pixel color, since some colors of light emitting diodes (LEDs) may be more susceptible to parasitic charge than others.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
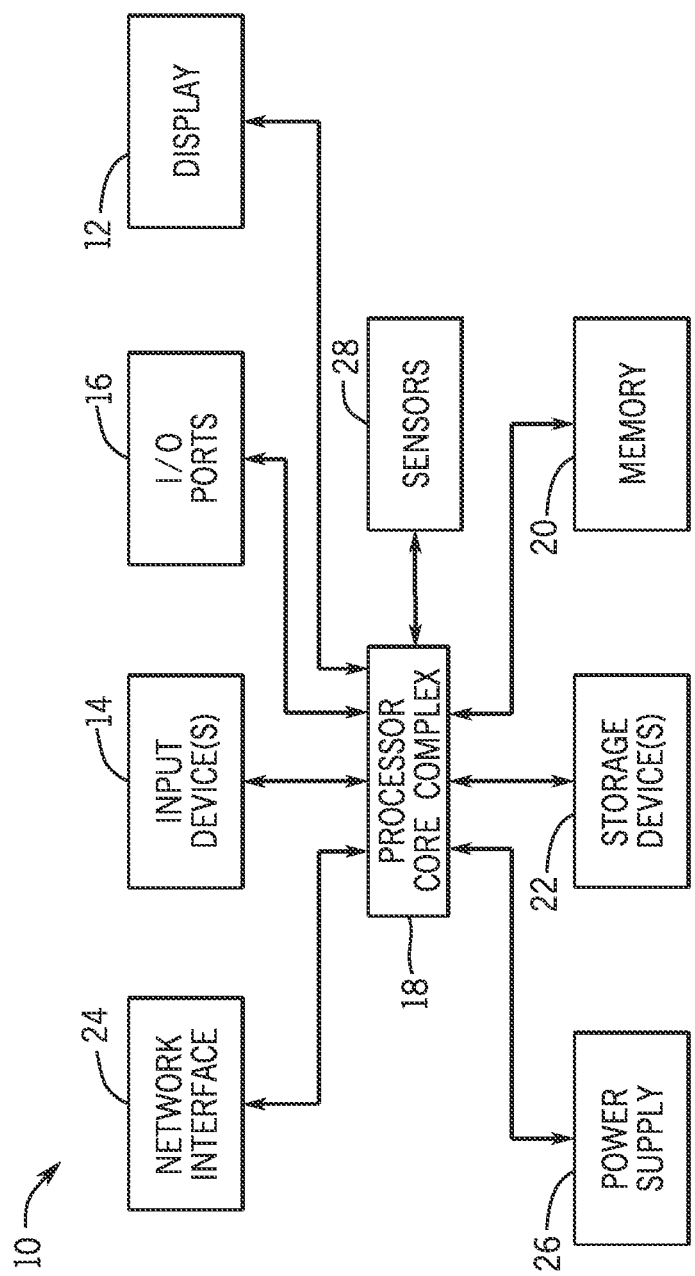
FIG. 1 is a block diagram of an electronic device with an electronic display.

An electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, a power source 26 (e.g., power supply), and sensors 28. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components in the electronic display 12, which may represent one example of the type of sensors 28 that may be present. The touch sensing components may receive user inputs by detecting occurrence or position of an object touching the surface of the electronic display 12.

The electronic display 12 may include a display panel with an array of display pixels. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling light emission from its display pixels based on image data associated with corresponding display pixels in the image. In some embodiments, image data may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on image data generated by the processor core complex 18, or the electronic display 12 may display frames based on image data received via the network interface 24, an input device, or an I/O port 16.

The sensors 28 may include a wide variety of sensing devices that may sense user input or environmental conditions. The sensors 28 may include temperature sensors, ambient light sensors, proximity sensors, position sensors (e.g., magnetometers, gyroscopes), and touch sensors. The sensors 28 may be disposed throughout the electronic device 10 or integrated into certain components. Some of the sensors 28 may be combined with or integrated into the electronic display 12. For example, temperature sensors of the sensors 28 may sense a current temperature of many areas of the electronic display 12, allowing image processing circuitry of the processor core complex 18 to provide image data correction based on the temperature of the electronic display 12. A touch sensor of the sensors 28 may receive user input by user touches on the electronic display 12. An ambient light sensor (ALS) of the sensors 28 may detect ambient light levels and/or color, allowing image processing circuitry of the processor core complex 18 to adjust a global brightness and/or white balance of image data for display on the electronic display 12.

Figure 2:
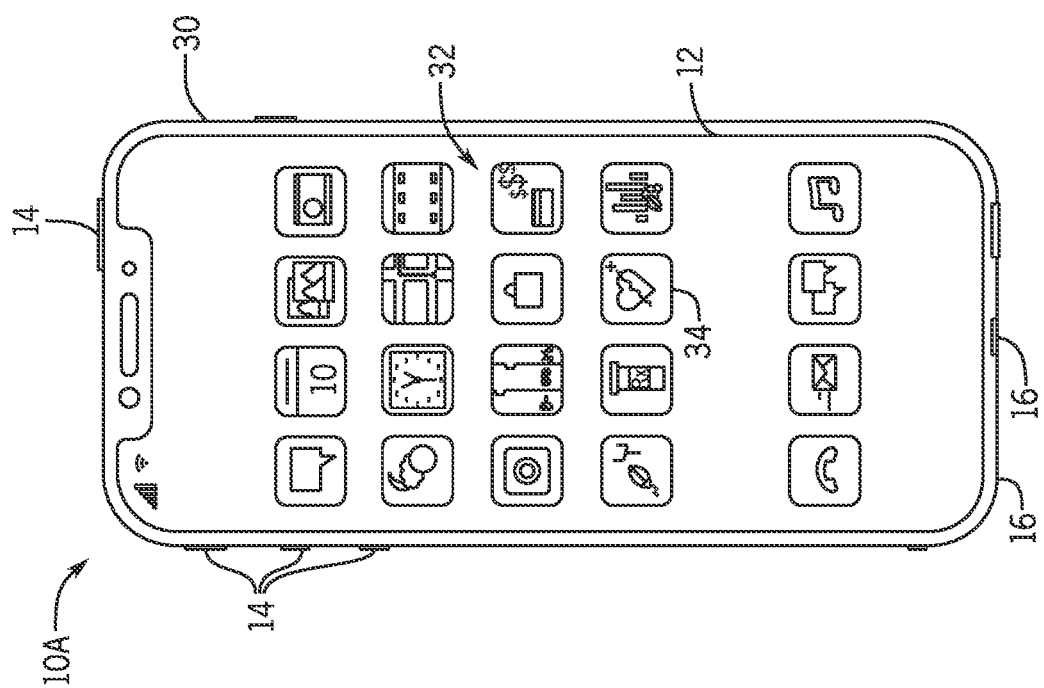
FIG. 2 is a front view of a handheld device representing an example of the electronic device of FIG. 1.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
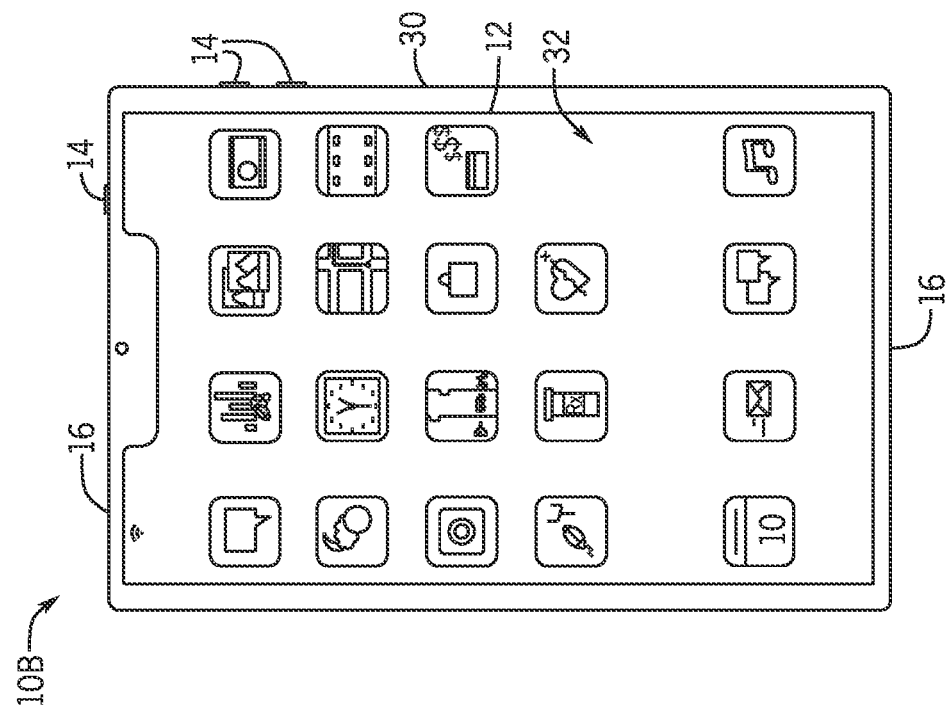
FIG. 3 is a front view of another handheld device representing another example of the electronic device of FIG. 1.
Figure 4:
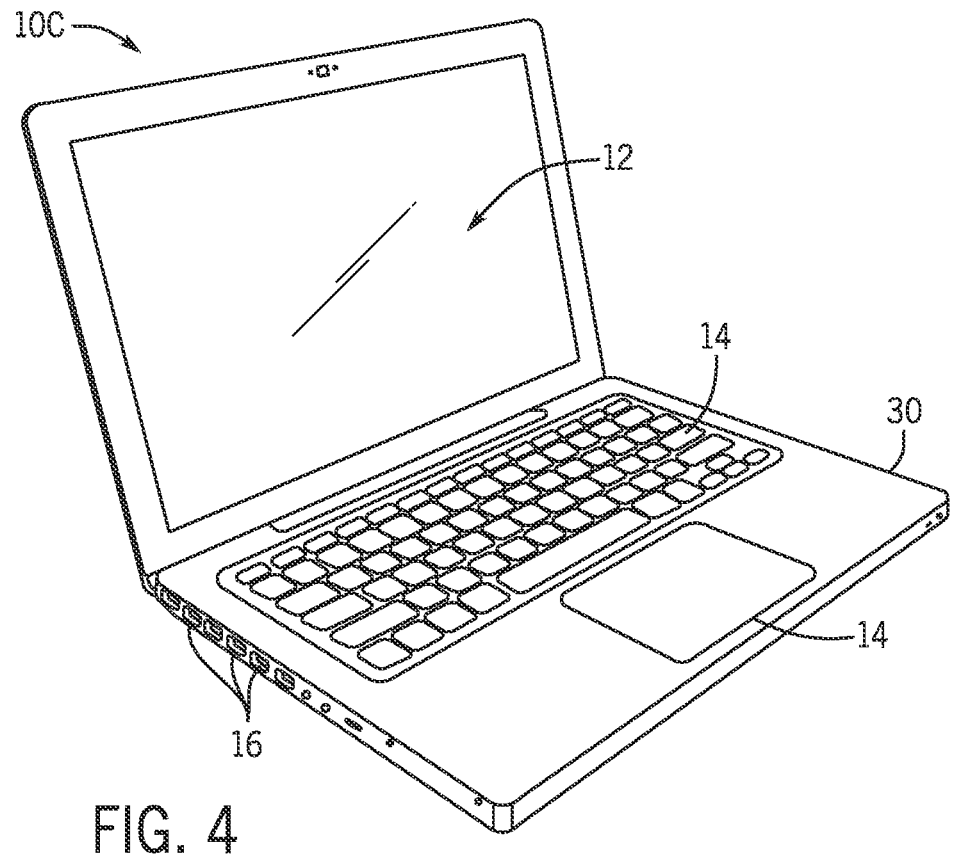
FIG. 4 is a perspective view of a notebook computer representing an example of the electronic device of FIG. 1.
Figure 5:
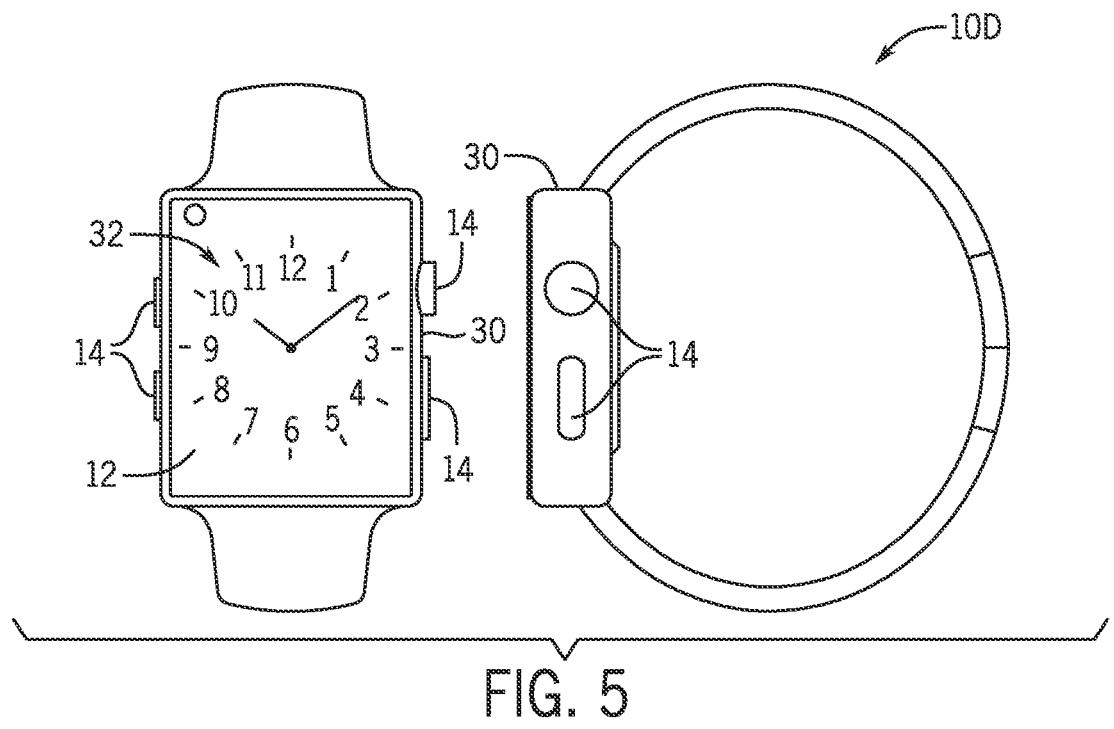
FIG. 5 illustrates front and side views of a wearable electronic device representing another example of the electronic device of FIG. 1.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MAC-BOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed with respect to FIGS. 2 and 3.

Figure 6:
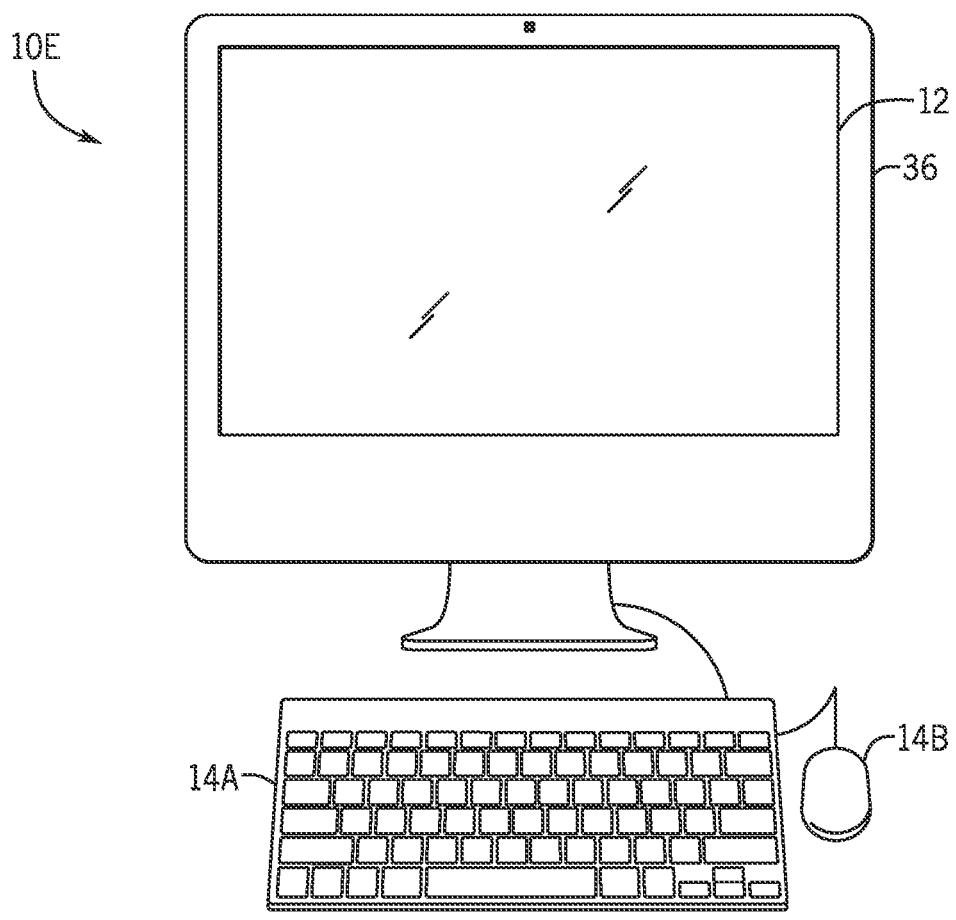
FIG. 6 is a front view of a desktop computer representing another embodiment of the electronic device of FIG. 1.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a Mac-Book®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input devices 14, such as the keyboard 14A or mouse 14B (e.g., input devices 14), which may connect to the computer 10E.

Figure 7:
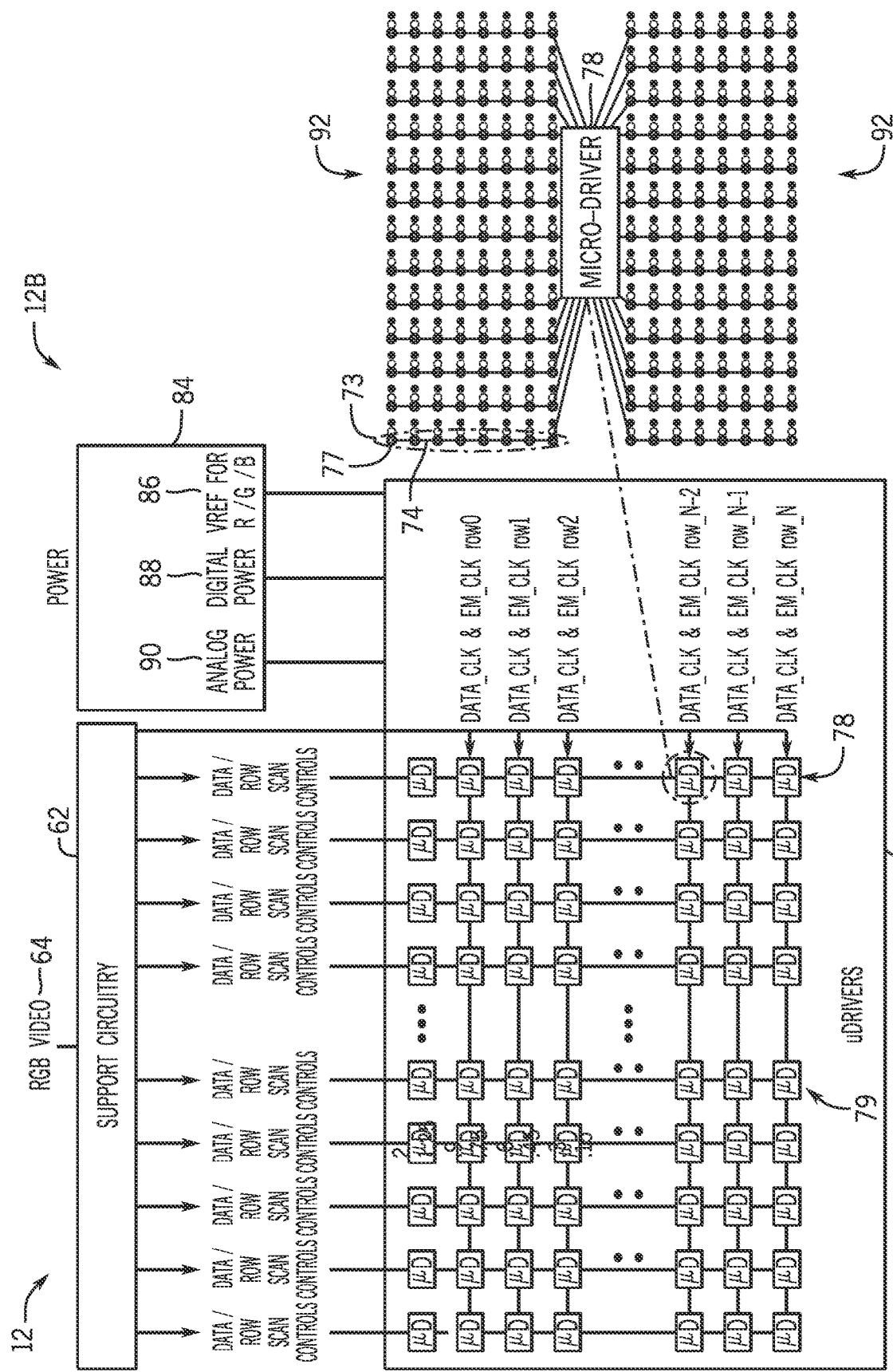
FIG. 7 is a block diagram of an electronic display that employs microdrivers to drive display pixels with controls signals.

FIG. 7 depicts the electronic display 12 in the form of a micro-LED display. The electronic display 12 uses an RGB display panel 60 with pixels that include red, green, and blue micro-LEDs as display pixels. Support circuitry 62 may receive RGB-format video image data 64. It should be appreciated, however, that the electronic display 12 may alternatively display other formats of image data, in which case the support circuitry 62 may receive image data of that image format. The support circuitry 62 may include a video timing controller (video TCON) and/or emission timing controller (emission TCON) that receives and uses the image data 64 in a serial bus to determine a data clock signal (DATA_CLK) and/or an emission clock signal (EM_CLK) to control the provision of the image data 64 in the electronic display 12. The video TCON may also pass the image data 64 to a serial-to-parallel circuitry that may deserialize the image data 64 signal into several parallel image data signals. That is, the serial-to-parallel circuitry may collect the image data 64 into the particular data signals that are passed on to specific columns among a total of M respective columns in the display panel 60. As noted above, the video TCON may generate the data clock signal (DATA_CLK), and the emission TCON may generate the emission clock signal (EM_CLK). Collectively, these may be referred to as Data/Row Scan Control signals, as illustrated in FIG. 7. As such, the data is labeled DATA/ROW SCAN CONTROLS. The data/row scan controls respectively contain image data corresponding to pixels in the first column, second column, third column, fourth column . . . fourth-to-last column, third-to-last column, second-to-last column, and last column, respectively. The data/row scan controls may be collected into more or fewer columns depending on the number of columns that make up the display panel 60.

In particular, the display panel 60 includes microdrivers 78. The microdrivers 78 are arranged in an array 79. Each microdriver 78 drives a number of display pixels 77. The display pixels 77 driven by each microdriver 78 may be arranged as a local passive matrix (LPM) 92. In one example, each microdriver 78 drives two local passive matrices (LPMs) 92 of display pixels 77, one above the microdriver 78 and one below the microdriver 78. The array 79 thus may have columns of LPMs 92 that include multiple different LPMs 92 that are driven by different microdrivers 78. For each LPM 92, different display pixels 77 may include different colored micro-LEDs (e.g., a red micro-LED, a green micro-LED, or a blue micro-LED) to represent the image data 64 in RGB format. Although one of the microdrivers 78 of FIG. 7 is shown to drive a local passive matrix (LPM) 92 having thirteen pixel columns 73 that include eight display pixels 77 each of a particular color (e.g., thirteen columns of red pixels, thirteen columns of green pixels, thirteen columns of blue pixels), each microdriver 78 may drive more or fewer pixel columns 73 that may include more or fewer respective display pixels 77 (e.g., 14 columns, 15 columns, 16 columns, 17 columns, 18 columns). As illustrated, the subset of display pixels 77 located on each pixel column 73 may be associated with a particular color (e.g., red, green, blue). As mentioned above, it should be noted that respective cathodes correspond to each display pixel 77 associated with a particular color even though each cathode for a particular color channel is not illustrated in FIG. 7. For example, each pixel column 73 may be coupled to a particular anode 74. In the example of FIG. 7, the labeled anode 74 corresponds to a red color channel (e.g., subset of red display pixels 77) and there may be a corresponding cathode for all color channels or a separate cathode corresponding to the red color channel. There are a second set of anodes that couple to a green color channel (e.g., subset of green display pixels 77) and a third set of anodes that couple to a blue color channel (subset of blue display pixels 77), but these are not expressly illustrated in FIG. 7 for ease of explanation. Each microdriver 78 may drive one or more selected rows of display pixels 77 of each LPM 92 at a time.

A power supply 84 may provide a reference voltage (VREF) 86 to drive the micro-LEDs, a digital power signal 88, and an analog power signal 90. In some cases, the power supply 84 may provide more than one reference voltage (VREF) 86 signal. Namely, display pixels 77 of different colors may be driven using different reference voltages. As such, the power supply 84 may provide more than one reference voltage (VREF) 86. Additionally, or alternatively, other circuitry on the display panel 60 may step the reference voltage (VREF) 86 up or down to obtain different reference voltages to drive different colors of micro-LED.

Figure 8:
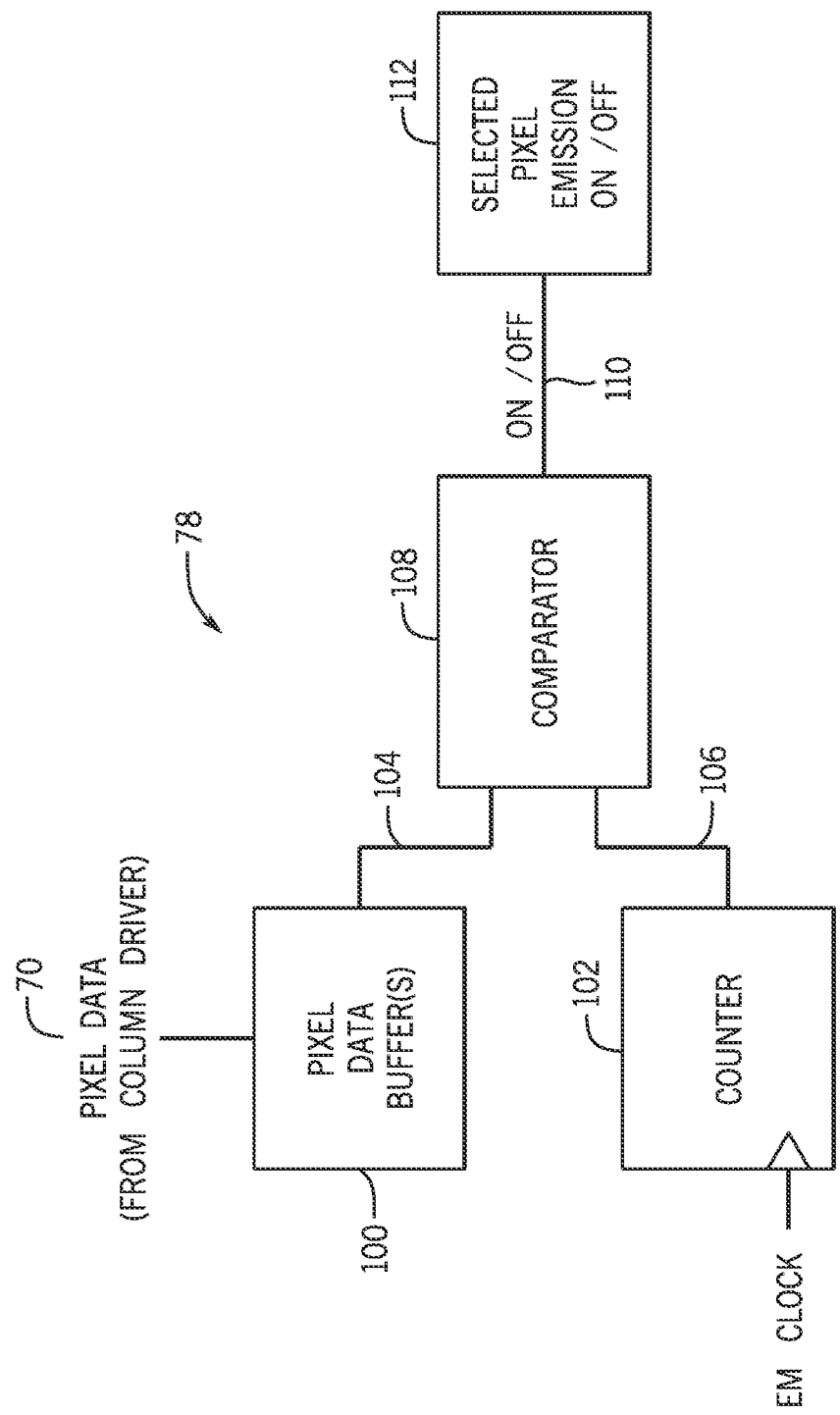
FIG. 8 is a block diagram schematically illustrating an operation of a microdriver of FIG. 7.

A block diagram shown in FIG. 8 illustrates some of the components of one of the microdrivers 78 used to drive one display pixel 77. The microdriver 78 shown in FIG. 8 includes pixel data buffer(s) 100 and a digital counter 102. The pixel data buffer(s) 100 may include sufficient storage to hold the image data 70 that is provided. For instance, the microdriver 78 may include pixel data buffers to store image data 70 for a display pixel 77 at any one time (e.g., for one RGB pixel group of 8-bit image data 70, this may be 24 bits of storage). It should be appreciated, however, that the microdriver 78 may include more or fewer buffers, depending on the data rate of the image data 70, the number of display pixels 77 to be driven by the image data 70, and the number of pixels 77 in selected row(s) of one of the local passive matrices (LPMs) 92 driven by the microdriver 78. The pixel data buffer(s) 100 may take any suitable logical structure based on the order that a column driver of the support circuitry 62 provides the image data 70. For example, the pixel data buffer(s) 100 may include a first-in-first-out (FIFO) logical structure or a last-in-first-out (LIFO) structure.

When the pixel data buffer(s) 100 have received and stored the image data 70, the microdriver 78 may receive the emission clock signal (EM_CLK). A counter 102 may receive the emission clock signal (EM_CLK) as an input. The pixel data buffer(s) 100 may output enough of the stored image data 70 to output a digital data signal 104 representative of a desired gray level for a particular display pixel 77 that is to be driven by the microdriver 78. The counter 102 may also output a digital counter signal 106 indicative of the number of edges (only rising, only falling, or both rising and falling edges) of the emission clock signal (EM_CLK). The signals 104 and 106 may enter a comparator 108 that outputs an emission control signal 110 in an "on" state when the signal 106 does not exceed the signal 104, and an "off" state otherwise. The emission control signal 110 may be routed to driving circuitry (not shown) for the display pixel 77 being driven, which may cause light emission 112 from the selected display pixel 77 to be on or off. The longer the selected display pixel 77 is driven "on" by the emission control signal 110, the greater the amount of light that will be perceived by the human eye as originating from the display pixel 77.

Figure 9:
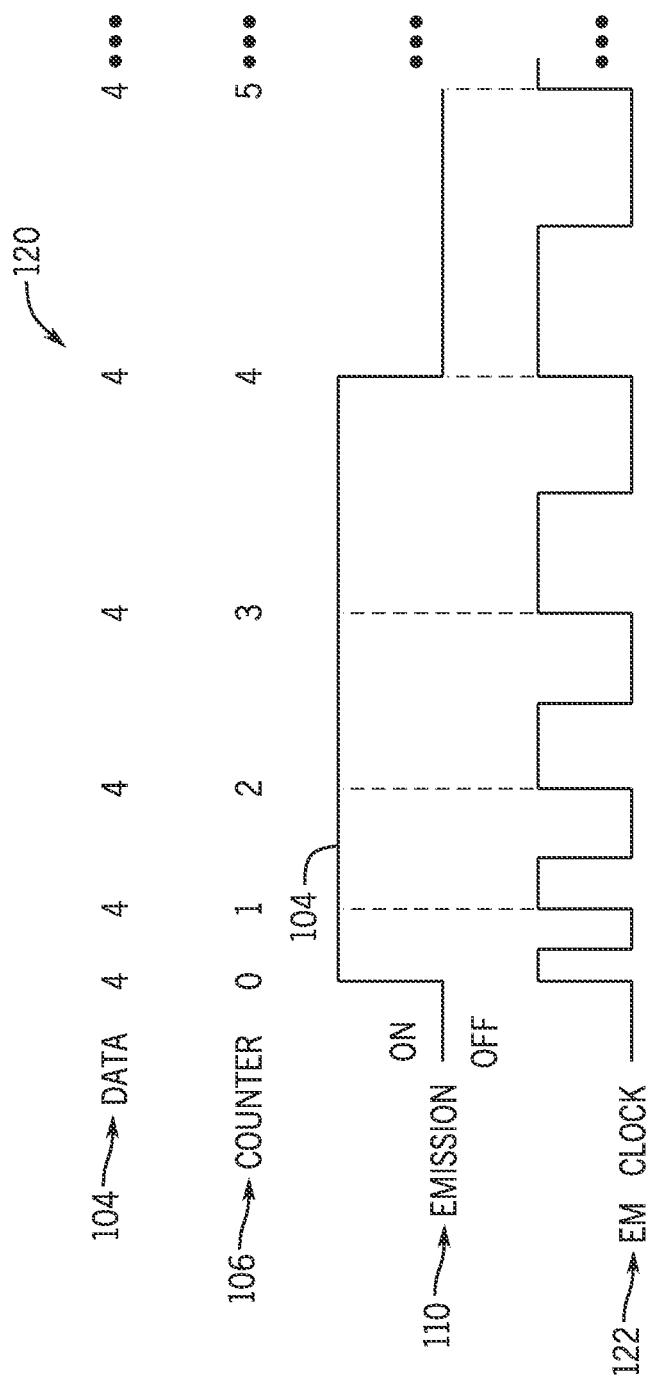
FIG. 9 is a timing diagram illustrating an example operation of the microdriver of FIG. 8.

A timing diagram 120, shown in FIG. 9, provides one brief example of the operation of the microdriver 78. The timing diagram 120 shows the digital data signal 104, the digital counter signal 106, the emission control signal 110, and an emission clock signal (EM_CLK) represented by numeral 122. In the example of FIG. 9, the gray level for driving the selected display pixel 77 is gray level 4, and this is reflected in the digital data signal 104. The emission control signal 110 drives the display pixel 77 "on" for a period of time defined as gray level 4 based on the emission clock signal (EM_CLK). Namely, as the emission clock signal (EM_CLK) rises and falls, the digital counter signal 106 gradually increases. The comparator 108 outputs the emission control signal 110 to an "on" state as long as the digital counter signal 106 remains less than the data signal 104. When the digital counter signal 106 reaches the value of the data signal 104, the comparator 108 outputs the emission control signal 110 to an "off" state, thereby causing the selected display pixel 77 no longer to emit light.

The intervals between gray levels correspond to the intervals between emission clock signal (EM_CLK) edges. Based on the way humans perceive light, to notice the difference between lower gray levels, the difference between the amounts of light emitted between two lower gray levels may be relatively small. To notice the difference between higher gray levels, however, the difference between the amounts of light emitted between two higher gray levels may be comparatively much greater. The emission clock signal (EM_CLK) therefore may use relatively short time intervals between clock edges at first. To account for the increase in the difference between light emitted as gray levels increase, the differences between edges (e.g., periods) of the emission clock signal (EM_CLK) may gradually lengthen. The particular pattern of the emission clock signal (EM_CLK), as generated by the emission TCON, may have increasingly longer differences between edges (e.g., periods) so as to provide a gamma encoding of the gray level of the display pixel 77 being driven.

Figure 10:
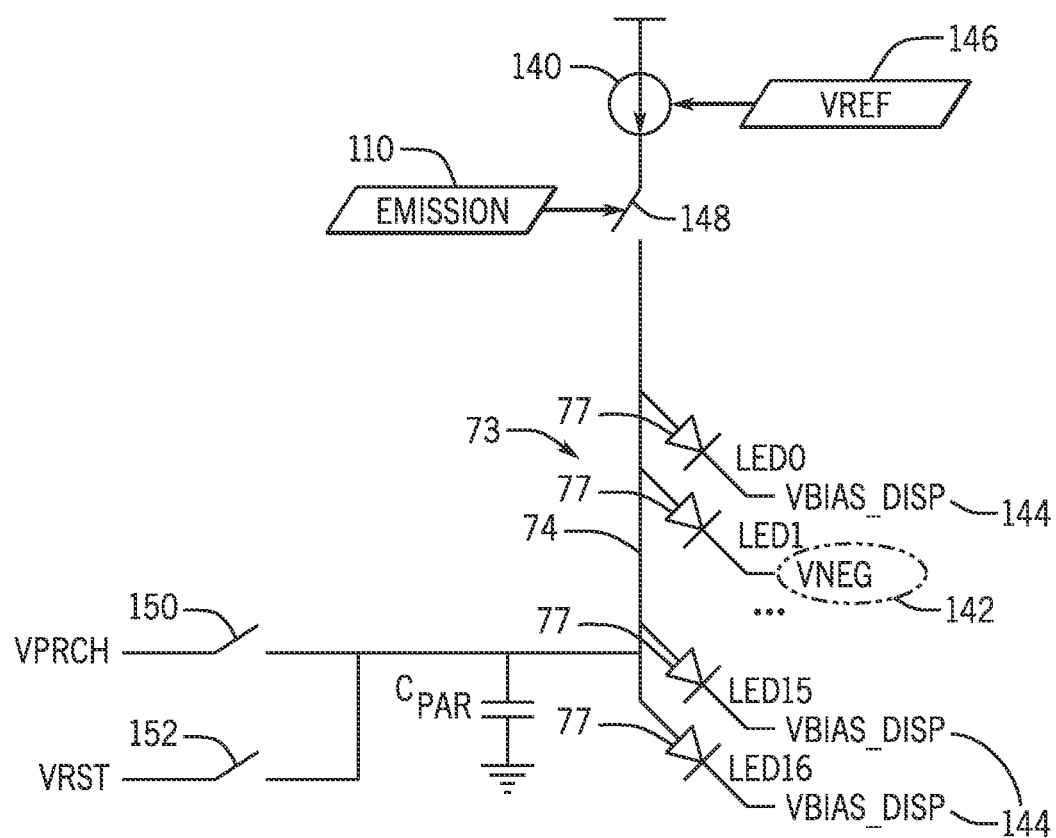
FIG. 10 illustrates circuitry that may be used by the electronic display of FIG. 7 to drive a row of display pixels.

The architecture of the LPMs 92 of the electronic display 12 allows for multiplexing of image data by programming the same image data into multiple pixels of different rows at once. Thus, each row of display pixels 77 may be driven one row at a time or multiple rows at a time. FIG. 10 illustrates selectively driving display pixels 77 on a common anode 74 (e.g., forming a column 73 of display pixels 77 of an LPM 92). Driving circuitry 140 may provide a driving signal on an anode 74 that is shared by multiple display pixels 77. By coupling a low voltage (VNEG) 142 to a cathode of a selected display pixel 77, here shown as LED1, the selected display pixel 77 may be made to emit light. Cathodes of unselected display pixels 77 may be coupled to a higher voltage. The low voltage (VNEG) 142 may be any suitable voltage low enough to cause a voltage difference across the μLED of the selected row of display pixels 77 that exceeds a diode threshold voltage. The higher voltage (VBIAS_DISP) 144 may be any suitable voltage high enough to cause the voltage difference across the μLEDs of the unselected display pixels 77 not to exceed the diode threshold voltage. In some implementations (e.g., as shown in FIG. 7), a cathode corresponding to a row of multiple columns of display pixels 77 may be coupled to the low voltage (VNEG) 142.

The driving circuitry 140 may provide the driving signal at a particular current based on a reference voltage 146 (e.g., one of the reference voltages 86 shown in FIG. 7). A switch 148 controlled by the emission signal 110 may selectively pass the driving signal from the driving circuitry 140 to the display pixel 77 for a particular amount of time. The longer the switch 148 is closed, the more light that is emitted by the selected display pixel 77. Thus, as the emission signal 110 varies, so too does the amount of light emitted by each selected display pixel 77. Other switches (e.g., 150, 152) may selectively close to provide a precharge voltage (VPCH) or reset voltage (VRST) to the anode 74. Since the anode 74 naturally includes a parasitic capacitance (Cpar), the precharge voltage (VPCH) provides sufficient charge to the anode 74 so that the selected display pixel 77 may quickly begin to emit light as soon as the switch 148 is closed and the driving circuitry 140 provides the driving signal. Without the precharge signal, it is possible that the initial moments after the switch 148 closes may be spent at a lower-than-sufficient voltage due to the parasitic capacitance. The reset voltage (VRST) may be any suitable voltage used to clear excess charge that may be stored in the parasitic capacitance (Cpar) of the anode 74 after the driving signal is no longer being provided to the selected display pixel 77 (e.g., when the switch 148 is open). As will be discussed below, the reset voltage (VRST) may be provided at strategic times to save power while reducing or eliminating image artifacts that could arise if the parasitic capacitance were to remain highly charged. The electronic display 12 may also be made to select multiple rows at once. This may be accomplished by coupling the cathodes of multiple rows to the low voltage (VNEG) 142.

Figure 11:
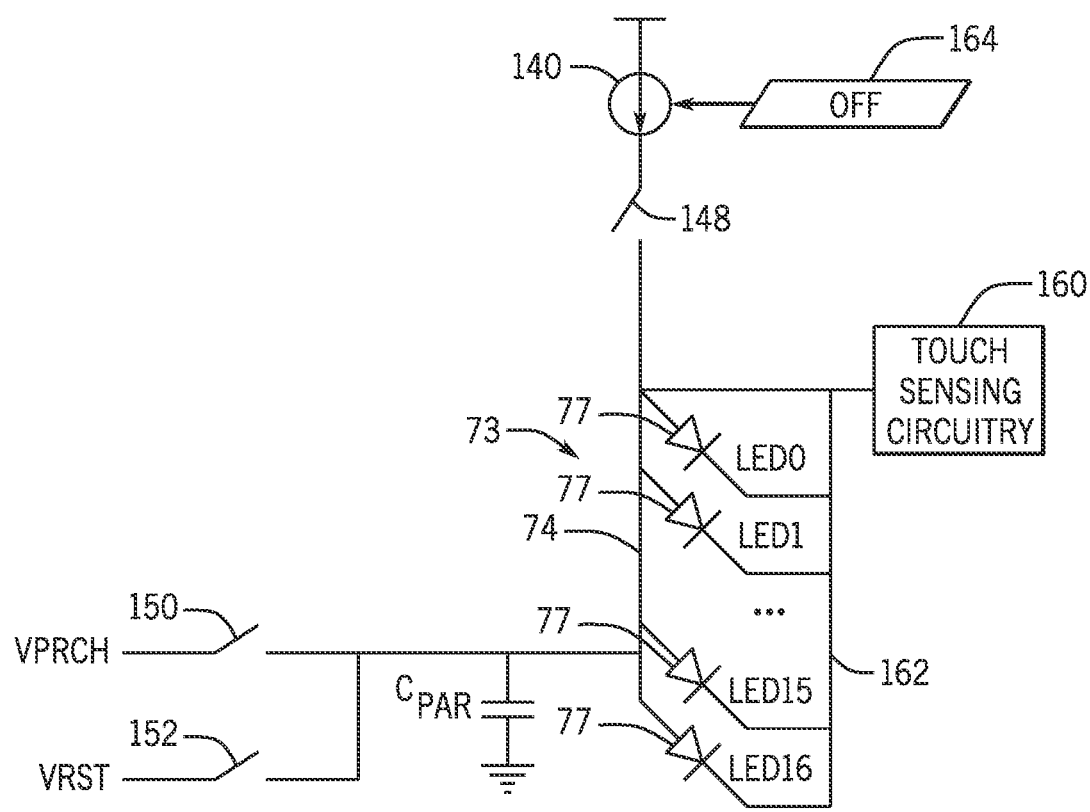
FIG. 11 illustrates circuitry that may be used by the electronic display of FIG. 7 to perform touch sensing when not driving any rows of display pixels.

Touch sensing circuitry 160 (as shown in FIG. 11) may use the anodes 74 and cathodes 162 of columns of display pixels 77 for touch sensing when the display pixels 77 are not in use. The touch sensing circuitry 160 may couple the anode 74 to cathodes 162 of the display pixels 77 via any suitable switching circuitry (not shown) and use this circuit node as a touch drive or touch sense electrode for touch sensing. While the touch sensing circuitry 160 is performing touch sensing, the display pixels 77 may be dark. Thus, the driving circuitry 140 may be turned off by supplying the drive circuitry 140 with an off signal 164 (e.g., low voltage or zero voltage signal) if desired, thereby saving power.

Figure 12:
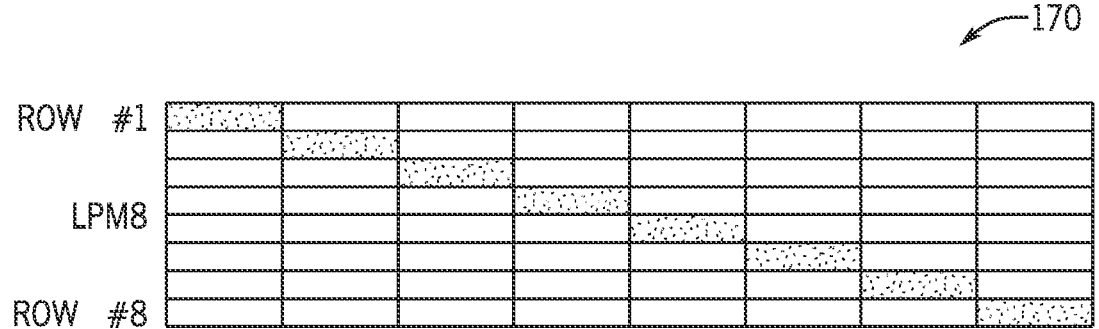
FIG. 12 is an example timing diagram for displaying image data on rows of the electronic display of FIG. 7 on an 8-row local passive matrix.
Figure 13:
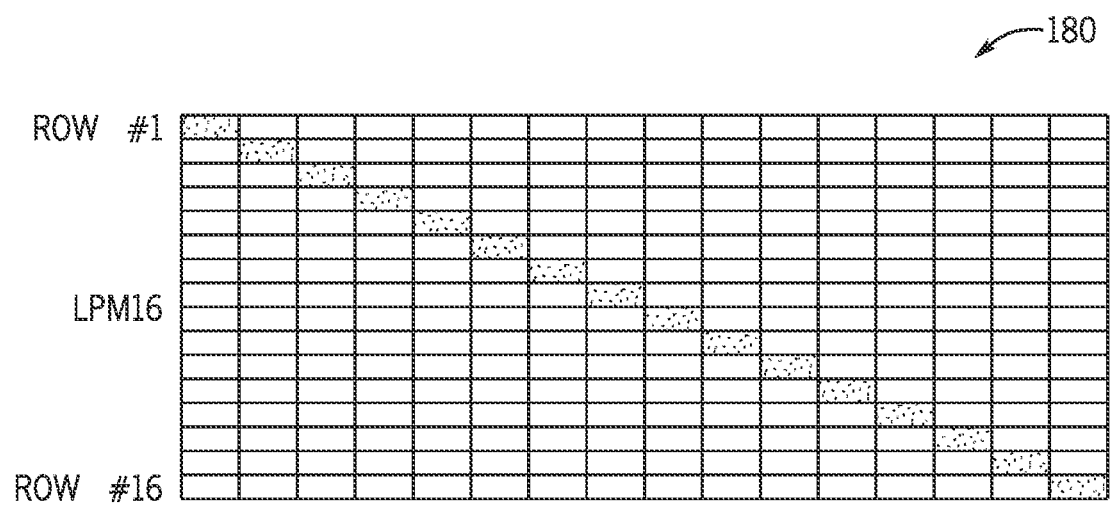
FIG. 13 is an example timing diagram for displaying image data on rows of the electronic display of FIG. 7 on a 16-row local passive matrix.

Individual local passive matrices (LPMs) 92 may be formed from multiple columns 73 of display pixels 77 on respective anodes 74 driven by respective driving circuitry 140. One row of an LPM 92 may be selected by coupling all of the cathodes corresponding to a particular row (e.g., all of LED_1) to the low voltage (VNEG) 142 while the other cathodes corresponding to other rows are coupled to the higher voltage (VBIAS_DISP) 144. Any suitable timing pattern may be used. Timing diagrams 170 of FIG. 12 and 180 of FIG. 13 illustrate an electronic display 12 driving different-sized LPMs 92. In FIG. 12, the timing diagram 170 shows the timing of light emission by row (ordinate) of an LPM 92 with 8 rows over time (abscissa). In FIG. 13, the timing diagram 180 shows the timing of light emission by row (ordinate) of an LPM 92 with 16 rows over time (abscissa). The timing diagrams 170 and 180 represent light emission from LPMs 92 over a single frame or subframe. Indeed, the pattern shown in FIGS. 12 and 13 may repeat multiple times in rapid succession (e.g., at 2×, 4×, 8×, 16×, 32×, etc. the rate at which new image frames of image data are generated).

Electronic Display and Sensor Coexistence

As mentioned above, many sensors 28 of the electronic device 10 may integrate with, or may be influenced by, the electronic display 12. For example, touch sensing and temperature sensing may be affected by electromagnetic interference of the operation of the electronic display 12, or in the case where touch sensing involves coupling the cathodes 162 and anode 74 of columns of display pixels together, operating the display pixels may be incompatible with touch sensing. Moreover, an ambient light sensor (ALS) may be prone to detect light from the electronic display 12 while the electronic display 12 is operating. To facilitate coexistence of the electronic display 12 with these sensors 28, the electronic display 12 may periodically enter a quiet period during which certain components of the electronic display 12 are inactive (e.g., operated in a lower power mode, turned off). During the quiet period, the sensors 28 may operate without interference from the electronic display 12.

Figure 14:
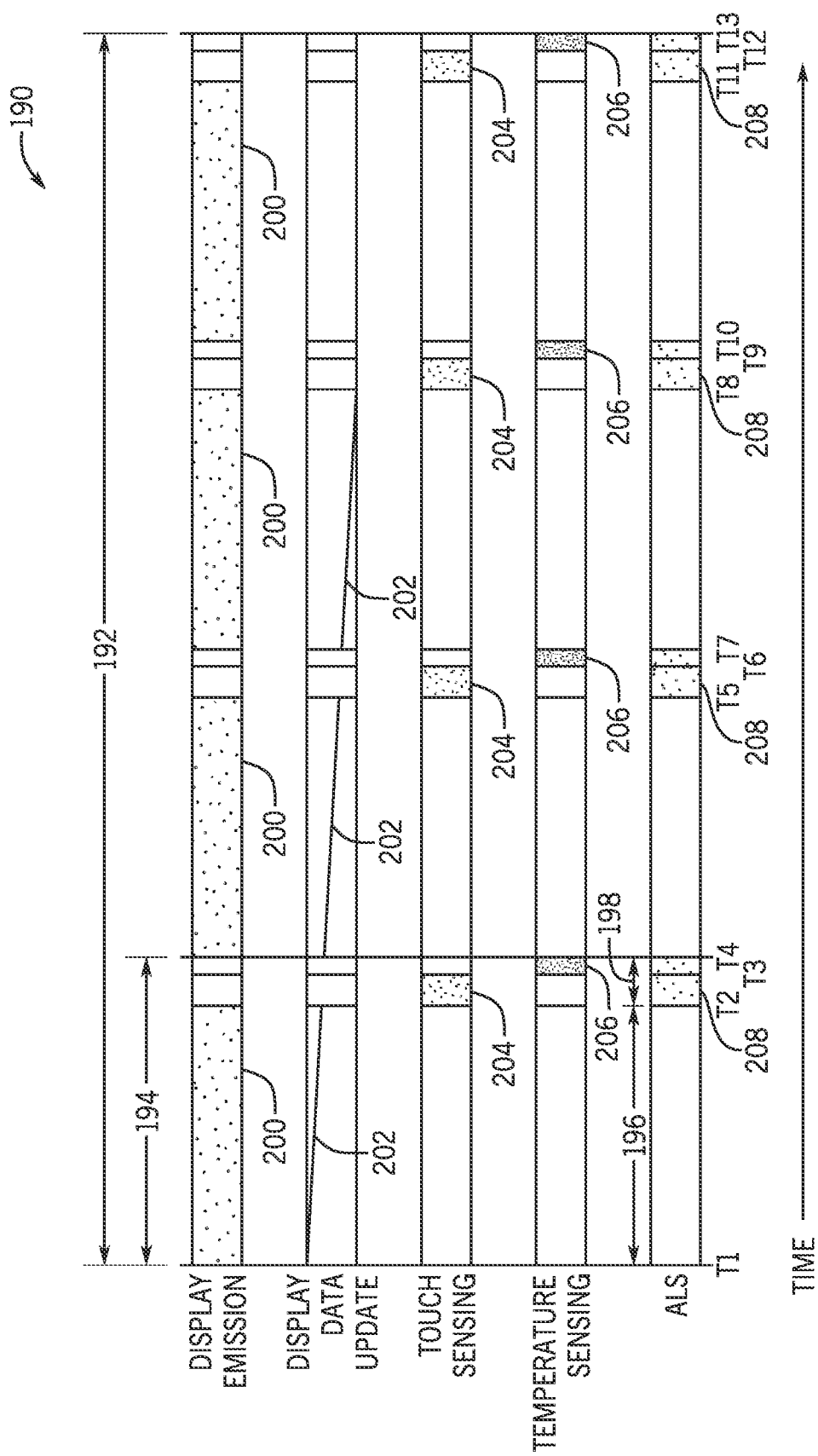
FIG. 14 is an example timing diagram for controlling the electronic display of FIG. 7 and various sensors to enable display and sensor coexistence.

An example timing diagram 190 of FIG. 14 illustrates one manner of providing electronic display 12 coexistence with several of the sensors 28 using a quiet period. The timing diagram 190 illustrates various operations that may take place over time during one image frame period 192. The image frame period 192 may have any suitable frequency (e.g., 30 Hz, 60 Hz, 120 Hz, 240 Hz, 480 Hz). The image frame period 192 is divided into a number of subgroups 194 that each include an active period 196 and a quiet period 198. While four subgroups 194 are shown in the timing diagram 190 of FIG. 14, there may be more or fewer. During the active period 196, the electronic display 12 is actively displaying content or programming content (e.g., times t1 to t2, t4 to t5, t7 to t8, t10 to t11). During the quiet period 198, various sensing operations may take place without interference from the electronic display 12 (e.g., times t2 to t4, t5 to t7, t8 to t10, t11 to t13). During the quiet period 198, the electronic display 12 may not be emitting light and parts of the electronic display 12 may even be placed into a lower-power mode. There may be any suitable ratio of time of the active period 196 to the quiet period 198 that allows the electronic display 12 to emit light without producing image artifacts such as flickering (e.g., 80.0/20.0, 82.6/17.4, 84.8/15.2).

As shown in FIG. 14, the first subgroup 194 includes a display emission period 200 and a display data update 202 during the active period 196 from time t1 to t2 and various sensing operations during the quiet period 198 from time t2 to t4. The display data update 202 corresponds to programming memory of the microdrivers 78 with new image data. The new image data will be displayed during the display emission periods 200 until another set of new image data is programmed (e.g., in a subsequent image frame period 192). The display data update 202 may not occur in every subgroup 194, depending on the amount of time involved in programming the memory of the microdrivers 78 with new image data; in any event, the total amount of time that the new content will be displayed on the electronic display 12 may be at least one image frame period 192.

Any suitable sensing operations may take place during the quiet period 198. For example, touch sensing 204 may take place from time t2 to t3. The touch sensing 204 may take place using integrated touch sensing circuitry 160 (e.g., as shown in FIG. 11) that uses the cathodes 162 and anodes 74 of the LPMs 92 to perform touch sensing or may take place using a non-integrated touch sensor subsystem (e.g., which may include touch sense or touch drive electrodes that are part of a separate layer bonded to the electronic display 12). When the touch sensing 204 is performed using integrated touch sensing circuitry 160, display emission from the display pixels 77 may not be done due to the coupling of the cathodes 162 to the anodes 74. The touch sensing 204 is shown to take place early in the quiet period 198. This may allow temperature sensing 206 to use some of the same datalines, power supplies, and/or control signals of the electronic display 12 that are also used during the display emission period 200 or the touch sensing 204. In other examples, temperature sensing 206 may take place before, after, or during the touch sensing 204 depending on the form of temperature sensing 206 used. Because the touch sensing 204 may couple the cathodes 162 to the anodes 74, performing the touch sensing 204 earlier in the quiet period 198 may also provide mitigation for image artifacts that could occur due to the quiet period 198. For example, performing the touch sensing 204 first in the quiet period 198 may reduce or eliminate a bright row artifact due to discharge of charge remaining in the parasitic capacitance of the anodes. Performing the touch sensing 204 first may also allow additional time after the touch sensing 204 but before the next display emission period 200 to prepare the circuitry of the electronic display 12 for emitting light to prevent certain image artifacts (e.g., dim row image artifacts). However, in other examples, the touch sensing 204 may take place later in the quiet period 198 or may take place over the entire quiet period 198.

Ambient light sensing (ALS) 208 may take place using an ambient light sensor (ALS). The ambient light sensing (ALS) 208 may take place any time during the quiet period 198 at which point light is not being emitted by the electronic display 12. Because the ambient light sensing (ALS) 208 may use an ambient light sensor that does not use internal electronic display 12 components (e.g., datalines, power supplies, and/or control signals of the electronic display 12), the ambient light sensing (ALS) 208 may take place in parallel with the touch sensing 204 or the temperature sensing 206. Additionally, during the quiet period 198, any other suitable operations may take place that may benefit from a lack of light emission or electromagnetic interference (e.g., proximity sensing by a proximity sensor, image detection by a front-facing camera).

Figure 15:
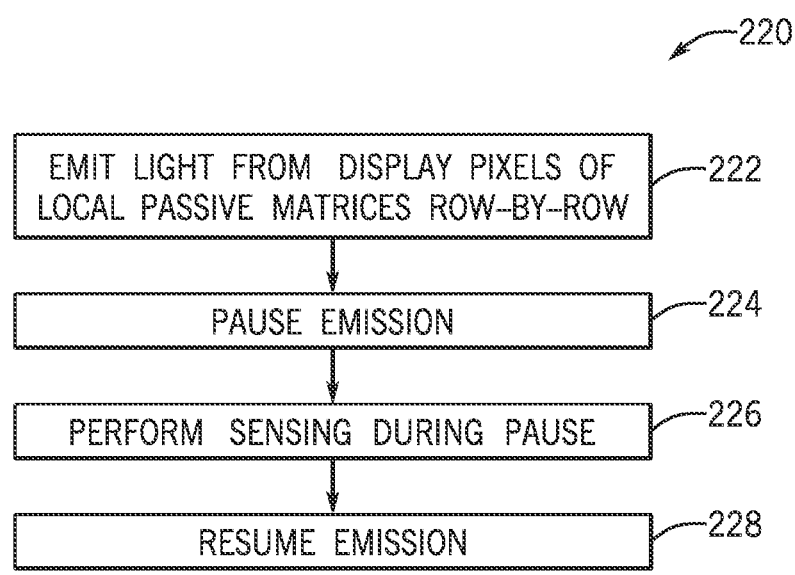
FIG. 15 is a flowchart of a method for operating a display for display and sensor coexistence.

FIG. 15 is a flowchart 220 of a method for operating an electronic display in coexistence with a variety of sensors corresponding to the timing diagram 190 of FIG. 14. At a first period, light may be emitted from the display pixels of the electronic display row-by-row (block 222). Emission may be paused (block 224). While the emission is paused (e.g., during a quiet period), one or several of the sensors of the electronic device may perform sensing operations (e.g., touch sensing, temperature sensing, ambient light sensing, proximity sensing, front-facing camera operation) (block 226). After sensing, emission may resume (block 228). This pattern may repeat several times for each image frame that is displayed on the electronic display.

Figure 16:
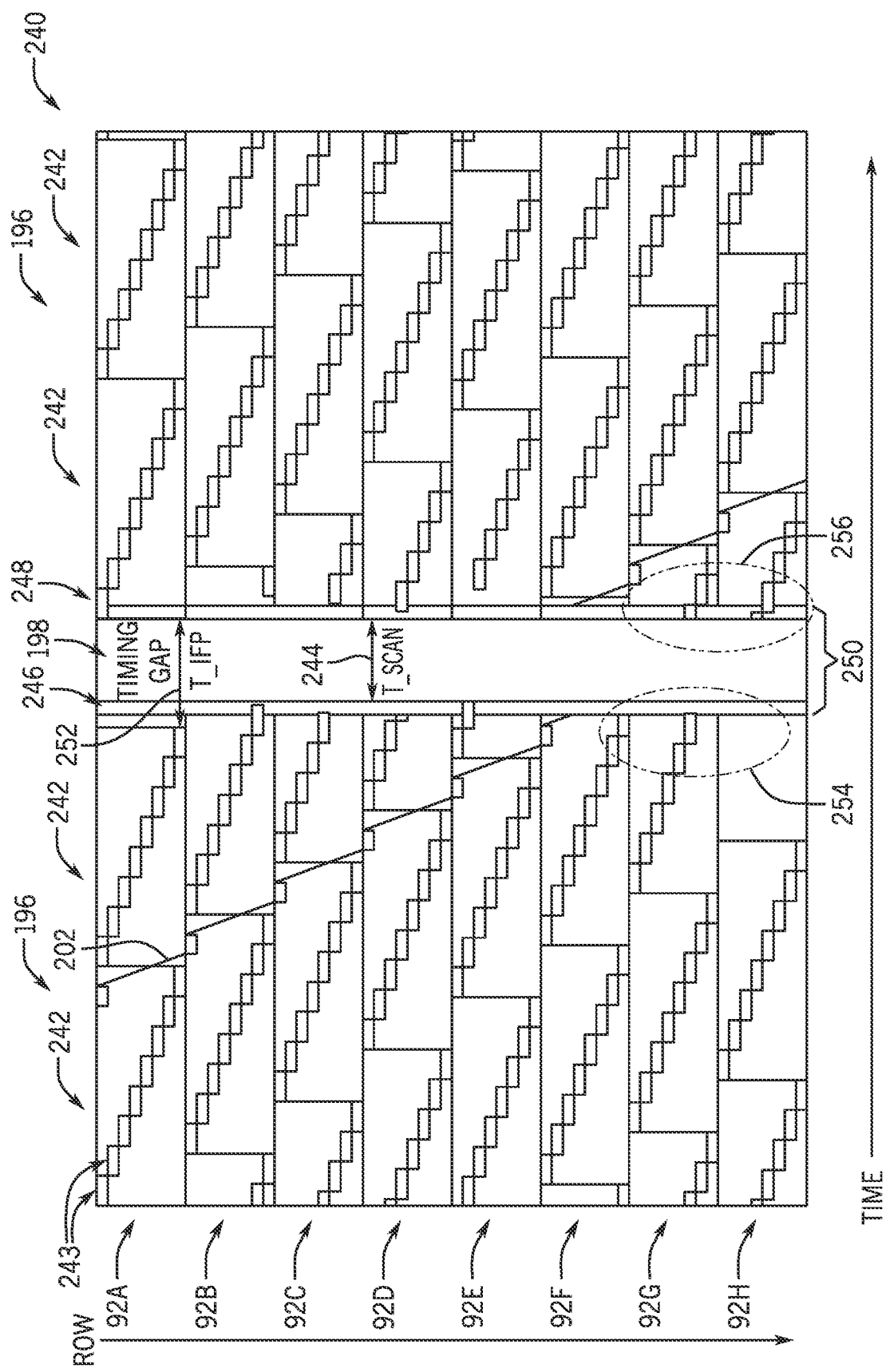
FIG. 16 is a timing diagram illustrating row display timing for multiple local passive matrices over time in relation to a quiet period during which sensors are operated to enable display and sensor coexistence.

FIG. 16 is a timing diagram 240 illustrating aspects of the transition from the active period 196 to the quiet period 198. The timing diagram 240 illustrates the timing of pixel emission from various rows (ordinate) of various LPMs 92 of the electronic display (here, shown as LPMs 92A, 92B, 92C, 92D, 92E, 92F, 92G, and 92H) over time (abscissa). Emission from the display pixels of the LPMs 92 may take place over multiple subframes 242. There may be numerous subframes 242 per image frame (e.g., there may be 2, 3, 4, 5, 6, 7, 8, 9, 10, 11, 12, 13, 14, 15, 16, 17, 18, 19, 20, 21, 22, 23, 24 or more subframes 242 per image frame of content). In FIG. 16, the LPMs 92 are shown to emit light from display pixels in row emission periods 243 sequentially row-by-row, but any other suitable row timing may be used. For example, row emission periods 243 may be shuffled from LPM 92 to LPM 92 and/or from subframe 242 to subframe 242 (e.g., a random row order, an arbitrary row order, reverse row order). The display data update 202 may program microdrivers corresponding to the LPMs 92 over time around the end of one subframe 242 and the beginning of another subframe 242, but could program the microdrivers mid-subframe 242 if desired.

To reduce the peak current drawn by the electronic display, different LPMs 92 may start a particular subframe 242 out of phase from other LPMs 92. By staggering the start of row emission in this way, the peak current drawn by display emission at any one point may be more likely to be lower than might occur if all LPMs 92 started at the same time. As a consequence, however, all LPMs 92 also may not stop emission at the same time. As such, the quiet period 198, during which sensing may be performed over a scan time T_SCAN 244, may also include a transition window 246 and a transition window 248. A total time 250 of the quiet period 198 thus may include the scan time T_SCAN 244, the transition window 246, and the transition window 248. The transition window 246 and the transition window 248 may be the same or may be different. From the start of the transition window 246, no new row emission may begin but any currently emitting rows may continue until complete. Accordingly, some LPMs 92 may pause emission immediately at the start of the transition window 246, while other LPMs 92 that have a later-starting phase may end partway through the transition window 246, and still other LPMs 92 may not end until the end of the transition window 246.

After sensing takes place over the scan time T_SCAN 244, row emission by the LPMs 92 may continue using the same phase offsets as before the quiet period 198. In particular, each LPM 92 may maintain a timing gap 252 from the end of the previous row emission before the quiet period 198 and the beginning of the next row emission after the quiet period 198. The timing gap 252 may be the same for all LPMs 92 to maintain the same phase offsets. In some cases, the timing gap 252 may be equal to the scan time T_SCAN 244 plus the transition window 246 or plus the transition window 248 (which may also be referred to as an exit gap period).

As the active period 196 ends, the electronic display 12 may undertake operations 254 during the transition window 246 to prevent the most recently emitting rows to continue emitting light during the quiet period 198. Examples of the operations 254 are described further with respect to FIG. 17. Other operations 256 may be performed to prevent dim next rows that emit light immediately after the quiet period 198. Examples of the operations 256 are described further with respect to FIG. 24.

Mitigation of Bright Line Image Artifact

Returning briefly to FIG. 10, it may be appreciated that the parasitic capacitance (Cpar) of the anode 74 may continue to hold a charge after a selected display pixel 77 (e.g., LED1) has been driven to emit light by the driving circuitry 140. Once emission stops (e.g., the switch 148 is open) during the quiet period 198, it is possible that remaining charge from the parasitic capacitance (Cpar) of the anode 74 may continue to travel across the selected display pixel 77 to the lower voltage (VNEG) 142 even in the absence of a driving signal from the driving circuitry 140. The amount of current that would travel across the selected display pixel 77 may be fairly low, meaning that the light emission from the selected display pixel 77 would be correspondingly low. However, because this small amount of light may take place over an extended time during the quiet period 198, which may be longer than the individual row emission periods of the active period 196, the total amount of light emitted during the quiet period 198 could be enough to be detectable by the human eye or a camera (particularly in a low ambient light environment). The additional light from the most recently used row of display pixels 77 before the quiet period 198 may produce an image artifact that appears as a bright line on that row.

Figure 17:
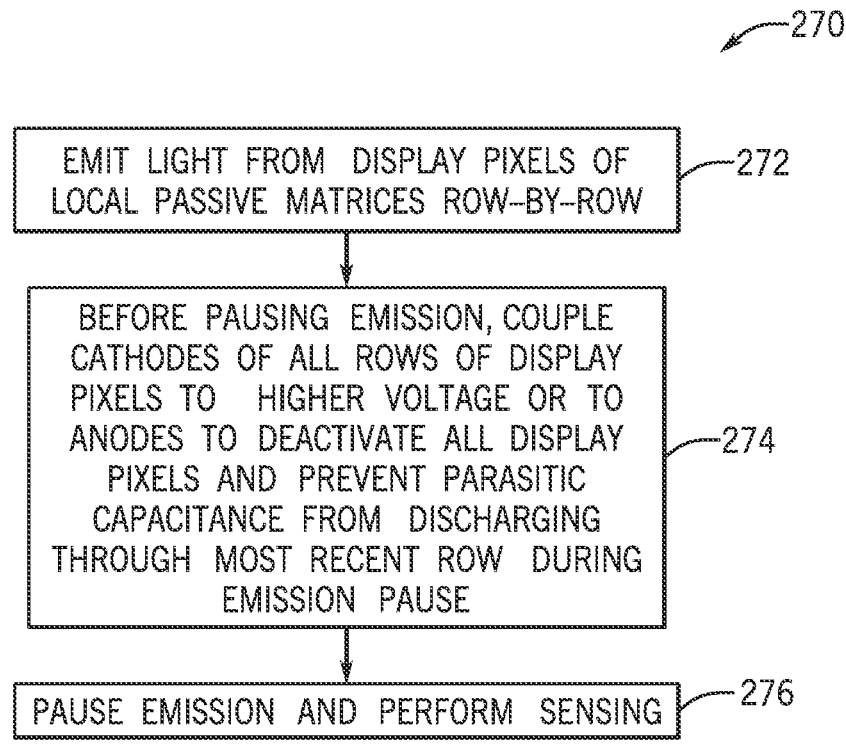
FIG. 17 is a flowchart of a method for reducing or eliminating a bright row image artifact due to the quiet period of FIG. 16.

A flowchart 270 of FIG. 17 provides one way to mitigate such bright line artifacts. When operating in the active period (e.g., 196 of FIG. 16), light may be emitted by display pixels from local passive matrices (LPMs) on a row-by-row basis (block 272). Before pausing emission for the quiet period (e.g., 198 of FIG. 16), the cathodes of all rows of display pixels may be coupled to a higher voltage (e.g., VBIAS) or shorted to the anodes to deactivate all the display pixels and prevent parasitic capacitance from discharging through the most recent row during the emission pause of the quiet period (block 274). Thus, in one example, the cathodes of all display pixels may be coupled to the higher voltage (e.g., VBIAS) to prevent the parasitic capacitance (Cpar) from discharging through the most recently emitting row during the emission pause of the quiet period. In another example, the act of performing touch sensing using integrated touch sensing circuitry that couples the anodes to cathodes may prevent the parasitic capacitance from discharging through the most recent row during the emission pause of the quiet period. During the quiet period, emission may be paused and sensing may be performed without a bright line image artifact (block 276).

Mitigation of G0 Glowing Image Artifact

Figure 18:
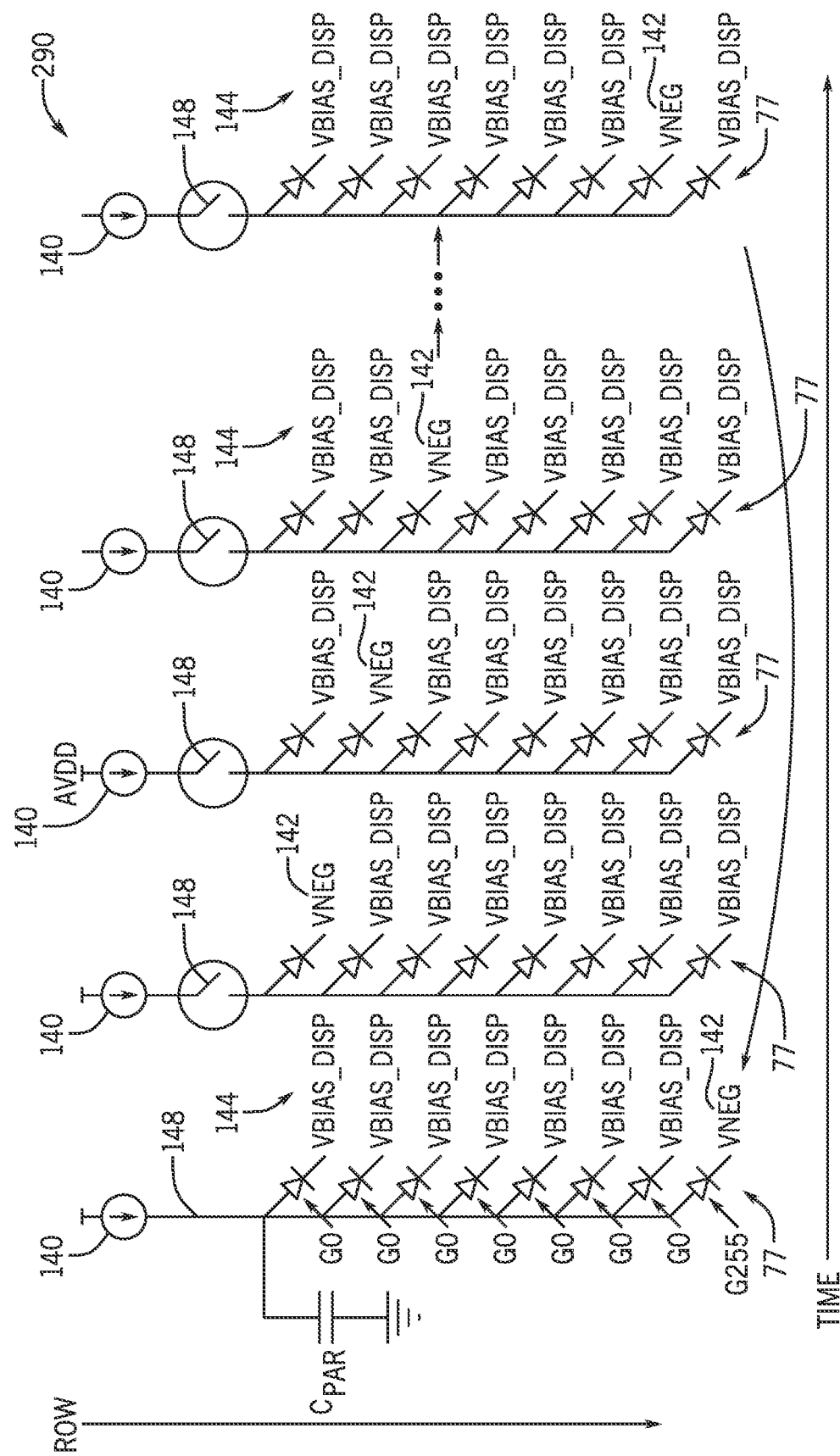
FIG. 18 is a timing diagram illustrating a condition in which a parasitic capacitance could be stored on a common anode of multiple pixels of different rows.

Another image artifact that may occur due to discharge by parasitic capacitance may arise when a display pixel is intended to have a gray level 0 (no light emission) following a display pixel on a row that has been driven at a higher gray level. Examples of this phenomenon appear in FIGS. 18 and 19. FIG. 18 illustrates a timing diagram 290 illustrating row emission (ordinate) over time (abscissa). In this example, the display pixels 77 of the first seven rows are to display gray level 0 (G0, meaning they are to emit no light). The display pixel 77 of the eighth row is to display gray level 255 (G255, the brightest gray level for an 8-bit bit depth). When the display pixel 77 of the eighth row is driven by the display driving circuitry 140 and the switch 148 is closed, the parasitic capacitance (Cpar) could be charged enough such that, when the switch 148 is open for subsequent rows, a small amount of current could traverse the display pixel 77. This could produce a faint amount of light when the display pixel 77 is intended to be dark. Even if the light emitted due to the parasitic capacitance is not enough to be detectable by the human eye, it is possible that it could be detected by a camera (particularly in a low ambient light environment). Such an image artifact may be most detectable when there is significant spatial distance between the last emitting row and the next row at gray level 0 (G0).

Figure 19:
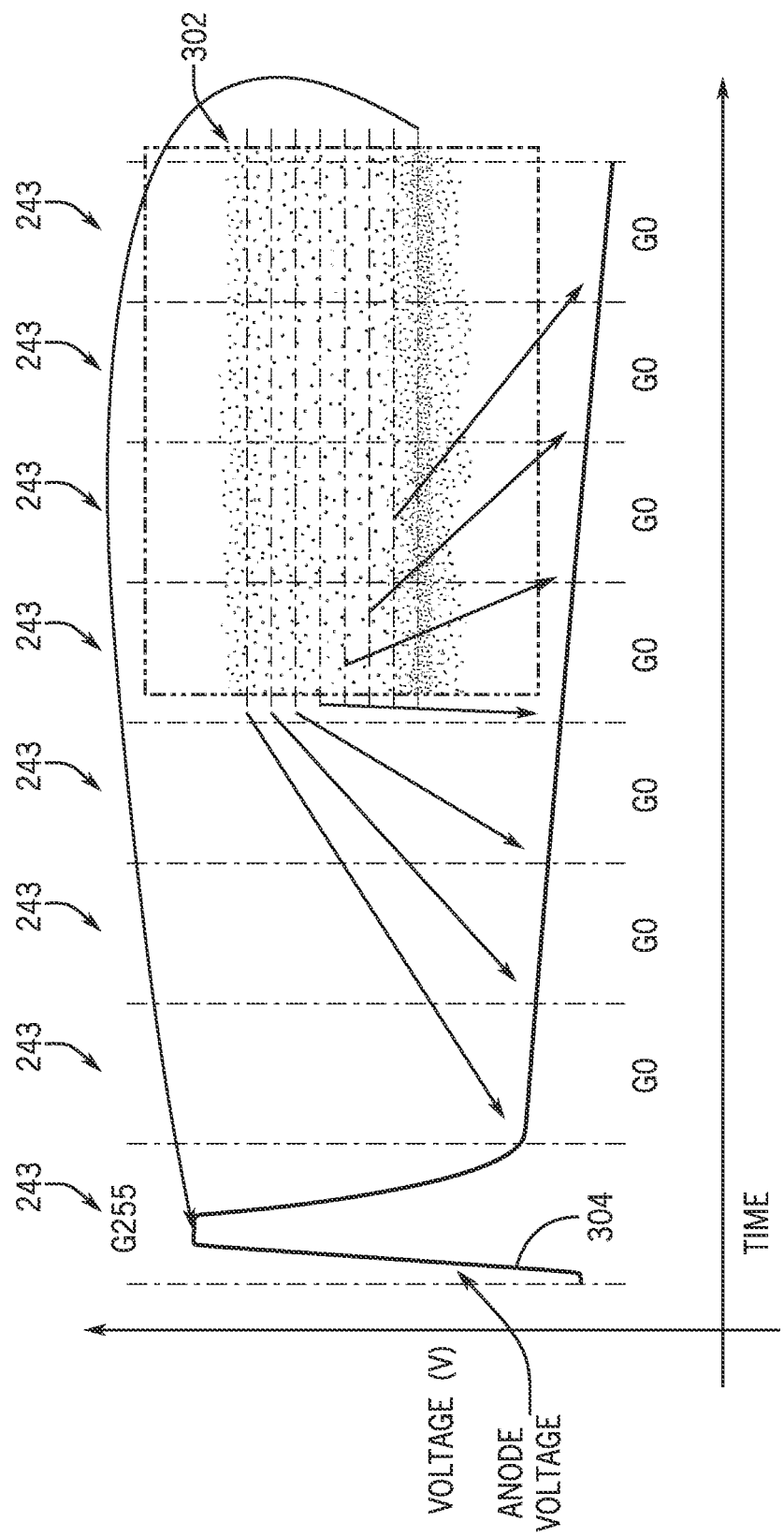
FIG. 19 is another timing diagram illustrating the effects of the condition in which the parasitic capacitance could be stored on a common anode of multiple pixels of different rows of FIG. 18.

FIG. 19 illustrates a plot of anode voltage (ordinate) over time (abscissa) between row emission periods 243. As shown in FIG. 19, a glowing effect 302 may occur if, as shown by a curve 304, the anode voltage for the next row does not return to a baseline voltage low enough not to produce a current across the display pixel for the next row emission period 243. Indeed, as shown in FIG. 19, the curve 304 shows the anode voltage reaching its peak during the first row emission period 243 while that display pixel is set to a maximum gray level (G255). To achieve light emission for G255, during the first row emission period 243, the switch 148 is closed for an extended period of time to allow the display pixel to emit a total amount of light corresponding to G255 at a particular global display brightness value. For the subsequent row emission periods where the display pixels are set to a lowest gray level (G0), the switch 148 remains open. This is so that, ideally, the display pixels set to G0 will emit no light. However, as seen by the curve 304, an elevated level of voltage may remain on the anode after the first row emission period 243. As such, there may be a small amount of light emitted from the display pixel in the next row emission period.

Figure 20:
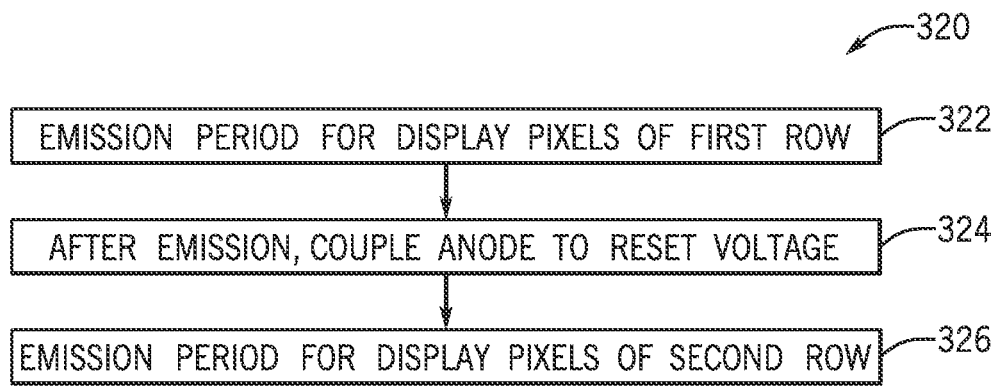
FIG. 20 is a flowchart of a method for reducing or eliminating the effects of the condition of FIG. 18 by coupling the anode to a reset voltage.
Figure 21:
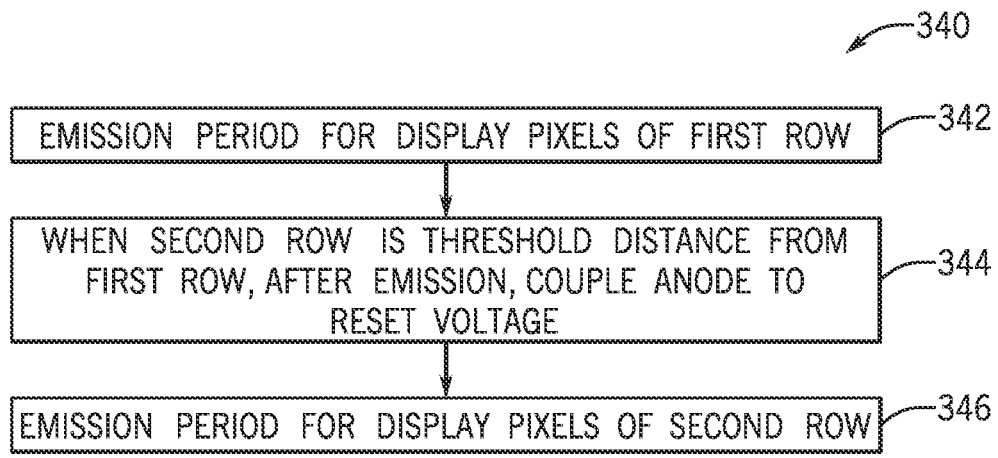
FIG. 21 is a flowchart of a method for reducing or eliminating the effects of the condition of FIG. 18 while saving power by coupling the anode to a reset voltage when two rows are a threshold distance apart.
Figure 22:
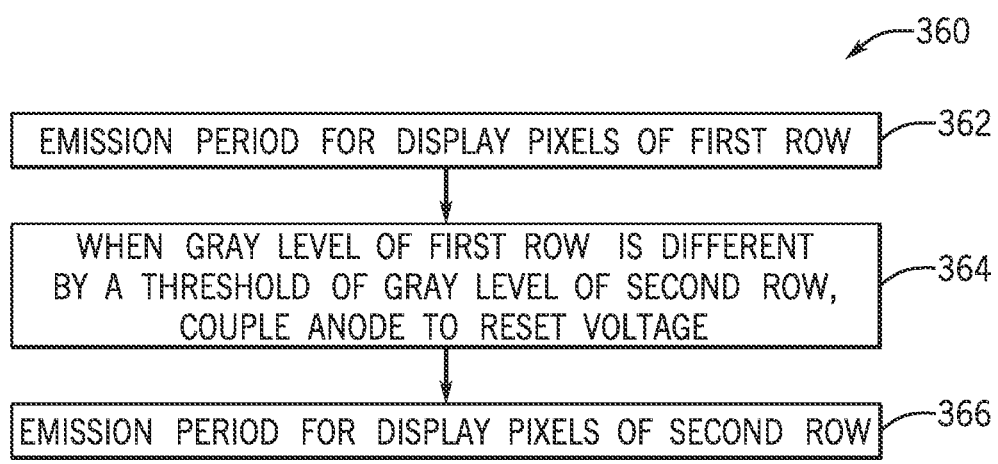
FIG. 22 is a flowchart of a method for reducing or eliminating the effects of the condition of FIG. 18 while saving power by coupling the anode to a reset voltage when a gray level of one row to a gray level of the next row exceeds a threshold.

FIGS. 20-22 describe methods that may mitigate these effects between a first row emission and a second row emission. As used in FIGS. 20-22, the terms first row emission and second row emission refer to any two adjacent row emission periods. When rows of an LPM 92 have sequential row emission periods (e.g., as in FIG. 12), the first row emission period may represent any row in the sequence and the second row emission period may represent any next row in the sequence (e.g., row 1 to row 2, row 8 to row 1). When the rows of an LPM 92 have shuffled row emission periods, the first row emission period may represent any row in the shuffled sequence and the second row emission period may represent any next row in the shuffled sequence (e.g., row 1 to row 6, row 8 to row 3, depending on the row shuffling sequence that is used).

In a flowchart 320 of FIG. 20, display pixels may be driven in a first row emission period (block 322). After the first row emission period, the anodes may be coupled to a reset voltage (block 324). Considering again the example of FIG. 10, the switch 152 may be closed and a reset voltage VRST may be applied to the anode 74 while the switch 148 is closed. The reset voltage VRST may be any suitable voltage that lowers the voltage of the anode 74 (e.g., by discharging the parasitic capacitance Cpar) to a voltage level sufficient not to produce a substantial current across a display pixel 77 when its cathode is coupled to the lower voltage (VNEG) 142 and the switch 148 is open. Returning to the flowchart 320 of FIG. 20, the reset voltage VRST may be decoupled from the anode and the electronic display 12 may begin an emission period for a second row (block 326).

The reset voltage VRST may be selectively applied based on a variety of possible factors. The various factors may be considered separately or together (e.g., the methods of FIGS. 20, 21, and 22 may be used in combination). This may save power by applying the reset voltage VRST just when the G0 glowing artifact may be most likely to be perceptible. For example, in a flowchart 340 of FIG. 21, display pixels of a first row may be driven in a first row emission period (block 342). When a second row associated with a second row emission period is some threshold distance from the first row, the anodes may be coupled to the reset voltage VRST (block 344). In this way, the reset voltage VRST may be used more sparingly, for situations where a glowing G0 artifact may be more likely to be noticeable such as when the two rows are far apart. For example, the threshold distance may correspond to the distance between a lowest row and a highest row of each LPM (e.g., row 8 to row 1), as shown in the examples of FIGS. 18 and 19. After the reset voltage VRST has been coupled to the anode for enough time to sufficiently discharge the parasitic capacitance Cpar, the reset voltage VRST may be decoupled from the anode and the electronic display 12 may begin an emission period for a second row (block 346).

Another factor by which the reset voltage VRST may be selectively applied is gray level. One example appears in FIG. 22. In a flowchart 360 of FIG. 22, display pixels of a first row may be driven in a first row emission period (block 362). When a gray level associated with a second row emission period is some threshold difference from that of the first row emission period, the anodes may be coupled to the reset voltage VRST (block 364). For example, when the second row emission is associated with a gray level 0 (G0) (e.g., any one of the display pixels in the row of the LPM are set to G0) and the first row emission is associated with a gray level at or above some threshold (e.g., G7, G63, G127, G255). In this way, the reset voltage VRST may be used more sparingly, for situations where a glowing G0 artifact may be more likely to be noticeable, such as when the previous gray level is relatively high. After the reset voltage VRST has been coupled to the anode for enough time to sufficiently discharge the parasitic capacitance Cpar, the reset voltage VRST may be decoupled from the anode and the electronic display 12 may begin an emission period for a second row (block 366).

Figure 23:
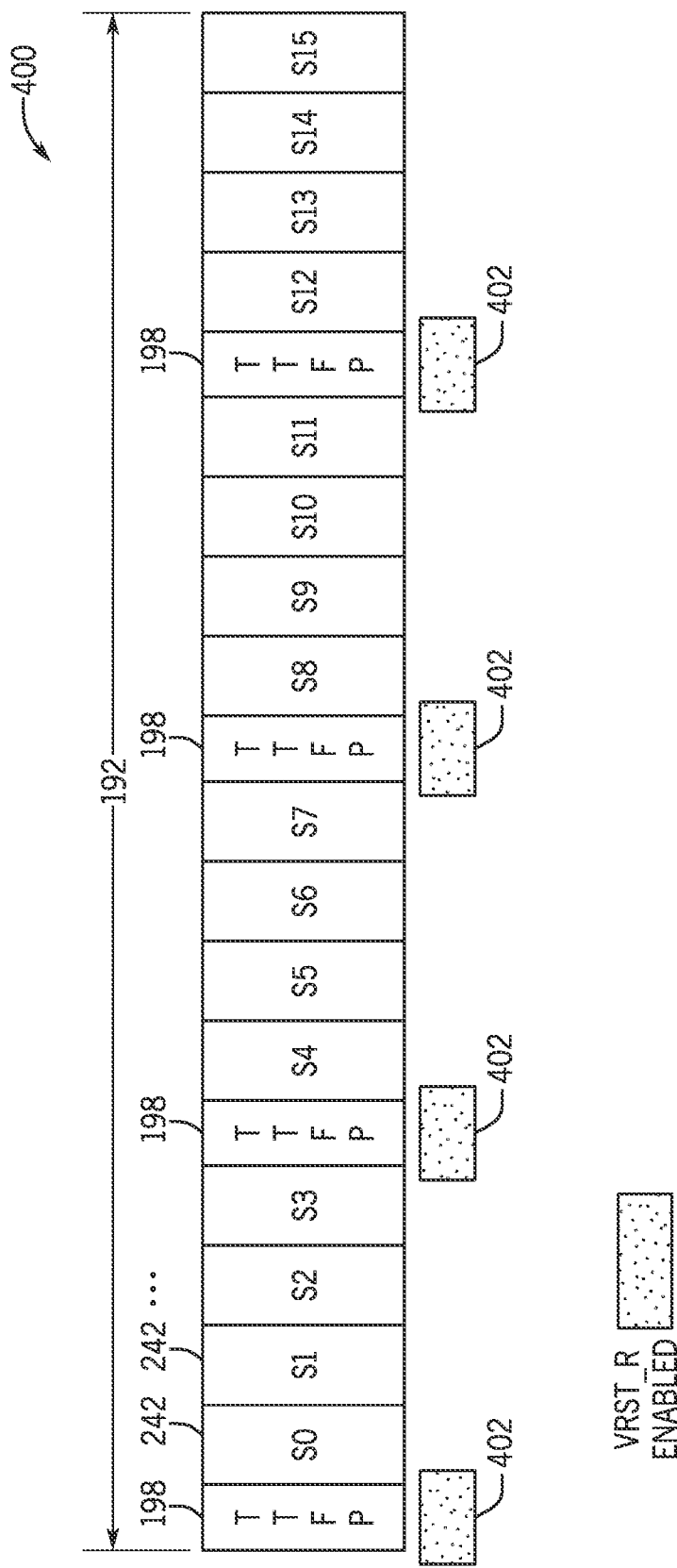
FIG. 23 is a timing diagram of a method for reducing or eliminating the effects of the condition of FIG. 18 while saving power by coupling the anode to a reset voltage at different frequencies for different color light emitting diodes (LEDs)

Since some colors of display pixels may be more affected by a G0 glowing image artifact than others, anodes for colors that are less affected may be reset less often. For example, red pixels may be less likely to suffer from G0 glowing image artifacts than blue or green pixels. Thus, in an example shown in a timing diagram 400 of FIG. 23, the red pixel reset voltage VRST_R 402 may be enabled for part of a last subframe 242 before a quiet period 198 and part of a next subframe 242 after the quiet period 198, whereas reset voltages for blue and green pixels may be enabled more often (e.g., at all times, at least once every subframe 242). For example, the red pixel reset voltage VRST_R 402 may be enabled during or after the last row emission before the quiet period 198 and disabled during or before the first row emission after the quiet period 198. In FIG. 23, the red pixel reset voltage VRST_R 402 is enabled before and after every quiet period 198, but in other examples, the red pixel reset voltage VRST_R 402 may be enabled only after some number of quiet periods 198. Even though the red pixel reset voltage VRST_R 402 may be enabled, the red pixel reset voltage VRST_R 402 may be applied more sparingly (e.g., as in FIG. 21 or 22).

Mitigation of Dim Line Image Artifact

Following a quiet period, the next row of display pixels to be activated for row emission may be dimmer than desired. This may be due to internal trap states of the display pixels and may be more noticeable at relatively lower gray levels (e.g., gray levels lower than gray level 16 (G16)). Returning briefly to FIG. 10, a precharge voltage VPCH may be applied to the anode 74 by closing the switch 150 to charge the anode 74 to a sufficient level. Once sufficiently charged, a selected display pixel 77 may output the expected amount of light when driven with the driving signal by the driving circuitry 140. The precharge voltage VPCH may be applied at various times (e.g., between row emissions) and may be very quick (e.g., on the order of hundreds of nanoseconds). After a quiet period (TFP), however, it may take longer to charge the anode 74 (e.g., on the order of multiple microseconds).

Figure 24:
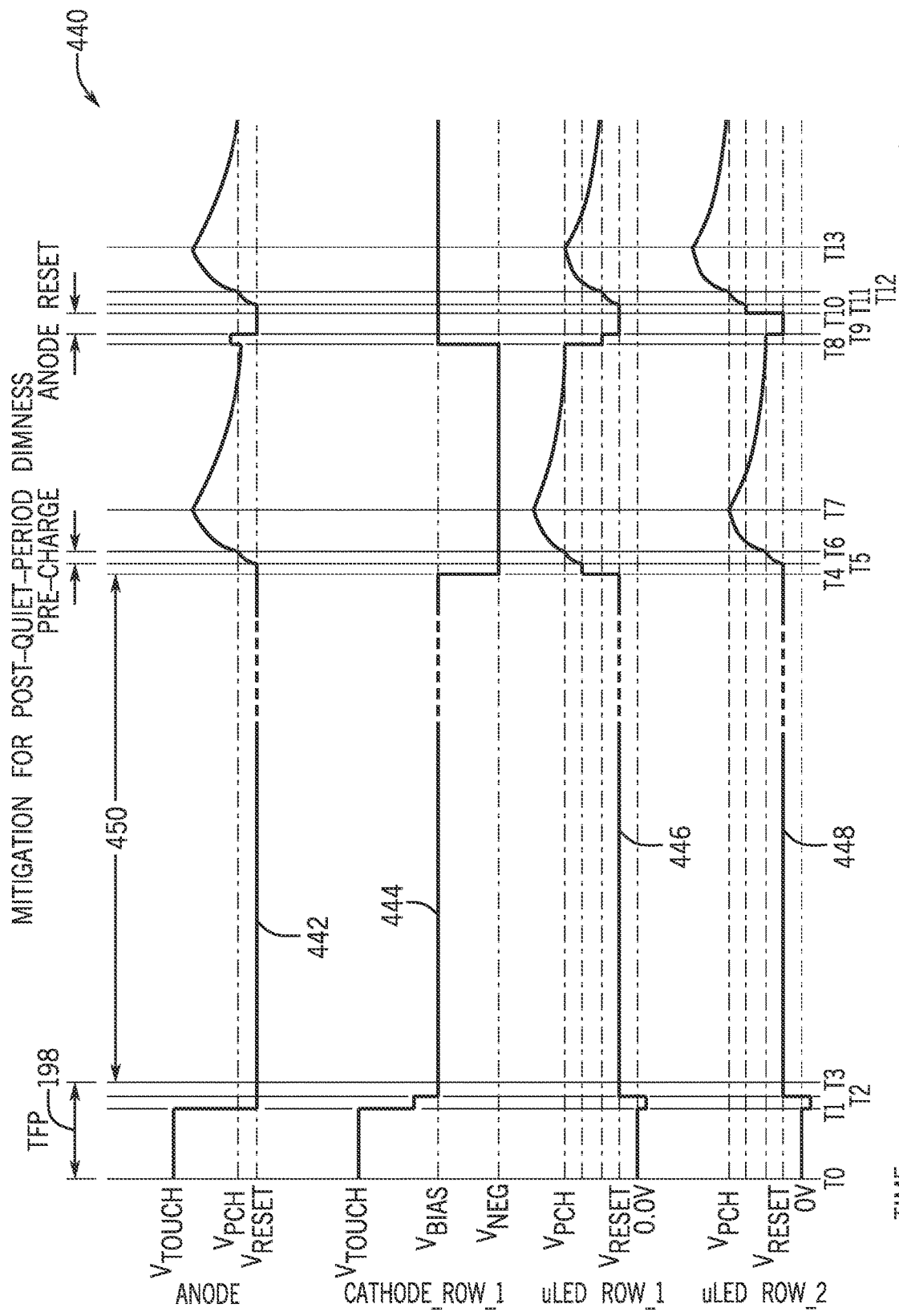
FIG. 24 is a timing diagram of a method for reducing or eliminating a dim row image artifact due to the quiet period of FIG. 16.

A timing diagram 440, shown in FIG. 24, illustrates one example operation of the electronic display 12 upon exit from a quiet period 198 to reduce or eliminate a dim line image artifact. The timing diagram 440 illustrates voltage on various components of the circuitry shown in FIG. 10 or 11 over time. A curve 442 represents voltage on the anode 74, a curve 444 represents a cathode voltage on a cathode (e.g., cathode_row_1) corresponding to a first row display pixel 77 (e.g., LED1), a curve 446 represents a voltage across the first row display pixel 77 (e.g., LED1) between the anode 74 and its cathode, and curve 448 represents a voltage across a second row display pixel 77 (e.g., LED2) between the anode 74 and its cathode.

The timing diagram 440 begins at time t0 during the quiet period (TFP) 198. At this point, the anode 74 and cathodes of the display pixels 77 are coupled together and have a voltage corresponding to a touch sensing operation, illustrated in FIG. 24 as a touch voltage (Vtouch). At a time t1 while the quiet period 198 is still ongoing, but after touch sensing has completed, the anodes 74 may be supplied with a reset voltage VRST (e.g., switch 152 may be closed) while the cathodes of the display pixels 77 are floating. At a time t2, still during the quiet period 198 but after the anodes 74 have settled to the reset voltage VRST, the cathodes of the display pixels 77 may be switched to the bias voltage (VBIAS_DISP) 144. In some cases, the cathodes of the display pixels 77 other than the cathode of the first row may be switched to the bias voltage (VBIAS_DISP) 144 before the first row (e.g., at t1) and the cathode of the first row may be switched to the bias voltage (VBIAS_DISP) 144 at the time t2.

Time t3 corresponds to the end of the quiet period 198 and the start of a period 450 of several non-emitting subframes that may terminate at a time t4. At time t3, the anodes 74 may be switched off from the reset voltage VRST (e.g., switch 152 may be open) and the anodes 74 may be floating. At lower gray levels, there may be non-emitting subframes and emitting subframes. For example, to achieve light emission for gray level 4 (G4), a display pixel 77 may not emit light for three subframes and emit light briefly during a fourth subframe. For lower gray levels, the non-emitting subframes may be timed to start first, so that while the non-emitting subframes are taking place, the cathodes of the display pixels 77 are coupled to the bias voltage VBIAS_DISP during non-emitting subframes while the anodes 74 are floating. The total amount of time of the non-emitting subframes may be sufficient to allow internal trap states of the display pixels 77 to return to pre-quiet-period states.

Thereafter, at time t4, the cathode of the display pixel 77 of the first row may be coupled to the lower voltage (VNEG) 142. From time t5 to t6, the anode 74 may be coupled to the precharge voltage VPCH (e.g., by closing the switch 150). After time t6, precharge voltage VPCH may be disconnected (e.g., by opening the switch 150) and emission may take place from the display pixel 77 of the selected row based on how long the switch 148 is closed between time t6 and t7. Due to the reset timing up to this point in the timing diagram 440 of FIG. 24, the emission may occur without or with a significantly reduced dim line artifact. At time t8, the cathode of the display pixel 77 of the first row may be coupled to the bias voltage (VBIAS) 144. At time t9, the reset voltage VRST may be applied to the anode 74 (e.g., by closing the switch 152). At time t10, the reset voltage VRST may disconnected (e.g., by opening the switch 152) and the anode 74 may be coupled to the precharge voltage VPCH (e.g., by closing the switch 150). Subsequently, from time t11 to t12, the anode 74 may be coupled to the precharge voltage VPCH (e.g., by closing the switch 150). After time t12, the precharge voltage VPCH may be disconnected (e.g., by opening the switch 150) and emission may take place from the display pixel 77 of the next row based on how long the switch 148 is closed between time t12 and t13.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
   an electronic display configured to display image content by light emission during an emission period and periodically enter a quiet period in which the light emission of the electronic display is turned off; and
   a plurality of sensors configured to perform sensing operations during the quiet period without interference from the electronic display;
   wherein the electronic display is configured to, before exiting the quiet period:
      switch anodes of display pixels of the electronic display to a reset voltage while cathodes of the display pixels are electrically floating;
      couple the cathodes of the display pixels to a bias voltage to prevent light emission; and
      switch anodes of the display pixels away from the reset voltage.

2. The electronic device of claim 1, wherein a subset of the plurality of sensors is at least partially integrated into the electronic display, wherein the subset of the plurality of sensors comprises:
   a touch sensor configured to detect a touch on the electronic display over a first period during the quiet period; and
   a temperature sensor configured to detect a temperature of the electronic display over a second period during the quiet period that does not overlap with the first period.

3. The electronic device of claim 1, wherein the plurality of sensors comprises a light sensor configured to detect ambient light during the quiet period.

4. The electronic device of claim 1, wherein the plurality of sensors comprises a temperature sensor configured to detect a temperature of the electronic display.

5. The electronic device of claim 1, wherein the plurality of sensors comprises a touch sensor configured to detect a touch on the electronic display during the quiet period.

6. The electronic device of claim 5, wherein the touch sensor is configured to detect the touch on the electronic display during the quiet period via electrodes formed from circuitry used during the emission period to cause display pixels to display the image content.

7. The electronic device of claim 1, wherein the electronic display is configured to periodically enter the quiet period multiple times per frame of the image content displayed on the electronic display.

8. The electronic device of claim 1, wherein the electronic display is configured to periodically pause image data programming of the electronic display during the quiet period.

9. The electronic device of claim 1, wherein the electronic display is configured to:
   emit light from display pixels of a local passive matrix row by row during the emission period; and
   before entering the quiet period, couple cathodes of the display pixels of the local passive matrix to the bias voltage to prevent light emission during the quiet period.

10. The electronic device of claim 1, wherein the electronic display is configured to, upon exiting the quiet period, refrain from driving the display pixels for a plurality of subframes of a frame of the image content.

11. The electronic device of claim 1, wherein at least some circuitry of the electronic display is powered down during the quiet period.

12. An electronic display comprising:
a column of display pixels coupled to a common anode and different respective cathodes;
driving circuitry configured to provide a driving signal over the common anode to drive one or more selected display pixels of the column of display pixels, wherein the one or more selected display pixels are configured to be selected when their cathodes are coupled to a lower voltage and cathodes of remaining display pixels are coupled to a higher voltage; and
a switch configured to provide a reset voltage on the common anode after the driving circuitry has driven a first one or more selected display pixels and before a second one or more display pixels are selected, wherein the switch is configured to provide the reset voltage on the common anode when the first one or more selected display pixels are separated from the second one or more display pixels by a threshold difference in rows.

13. The electronic display of claim 12, wherein the switch is configured to provide the reset voltage on the common anode when the first one or more selected display pixels is set to a gray level above a threshold.

14. The electronic display of claim 13, wherein the switch is configured to provide the reset voltage on the common anode when the second one or more display pixels is set to gray level 0.

15. The electronic display of claim 12, wherein the switch is configured to provide the reset voltage on the common anode selectively depending on a color of the column of display pixels.

16. The electronic display of claim 15, wherein the switch is configured to be enabled to provide the reset voltage periodically to save power.

17. The electronic display of claim 16, wherein the color of the column of display pixels is red.

18. A method comprising:
emitting light from display pixels of an electronic display to display image content of a first image frame;
pausing light emission from all display pixels of the electronic display during a quiet period;
performing a first sensing operation during the quiet period using a first sensor at least partially disposed in the electronic display;
after performing the first sensing operation, performing a second sensing operation during the quiet period using a second sensor at least partially disposed in the electronic display;
resuming emitting light from the display pixels after the quiet period to continue to display the first image frame;
pausing light emission from all display pixels of the electronic display during a second quiet period of the first image frame;
performing a third sensing operation during the second quiet period using the first sensor; and
after performing the third sensing operation, performing a fourth sensing operation during the second quiet period using the second sensor.

19. The method of claim 18, comprising, after performing the fourth sensing operation:
resuming emitting light from the display pixels after the second quiet period to continue to display the first image frame.

20. The method of claim 18, wherein:
emitting light from the display pixels of the electronic display comprises emitting light from the display pixels throughout a plurality of local passive matrices row-by-row, wherein different local passive matrices of the plurality of local passive matrices are offset in phase from one another; and
pausing the light emission comprises gradually pausing light emission during a first transition window into the quiet period, wherein no new rows begin light emission during the first transition window into the quiet period.

21. The method of claim 20, wherein resuming the light emission from the display pixels comprises gradually resuming light emission during a second transition window out of the quiet period.

22. The method of claim 18, wherein pausing the light emission from all display pixels of the electronic display during the quiet period comprises performing an operation to prevent illuminated pixels during the quiet period.

23. The method of claim 18, wherein resuming the light emission from the display pixels of the electronic display after the quiet period comprises performing an operation to prevent dim pixels immediately following the quiet period.

24. The electronic device of claim 1, wherein the electronic display is configured to enter the quiet period according to a ratio of time of an active period to the quiet period that allows the electronic display to emit light without producing a flickering image artifact.

25. The electronic device of claim 24, wherein the ratio of the active period to the quiet period is greater than 80.0/20.0.

* * * * *